US007651614B2

United States Patent
Kelsey et al.

(10) Patent No.: US 7,651,614 B2
(45) Date of Patent: Jan. 26, 2010

(54) METHODS FOR TREATMENT OF WASTEWATER

(75) Inventors: Robert L. Kelsey, Fair Oaks Ranch, TX (US); Qiwei Wang, Sugarland, TX (US)

(73) Assignee: VRTX Technologies, LLC, Schertz, TX (US)

( * ) Notice: Subject to any disclaimer, the term of this patent is extended or adjusted under 35 U.S.C. 154(b) by 0 days.

(21) Appl. No.: 12/030,643

(22) Filed: Feb. 13, 2008

(65) Prior Publication Data

US 2009/0026133 A1  Jan. 29, 2009

Related U.S. Application Data

(60) Provisional application No. 60/901,814, filed on Feb. 13, 2007.

(51) Int. Cl.
*C02F 3/02* (2006.01)
*C02F 3/28* (2006.01)
*C02F 3/30* (2006.01)

(52) U.S. Cl. ............... 210/607; 210/609; 210/624; 210/630; 210/631; 210/764; 210/787; 210/788

(58) Field of Classification Search ............... 210/631
See application file for complete search history.

(56) References Cited

U.S. PATENT DOCUMENTS

| | | | |
|---|---|---|---|
| 238,044 | A | 2/1881 | Luckenbach et al. |
| 2,773,029 | A | 12/1956 | Sebald |
| 2,821,346 | A | 1/1958 | Fisher |
| 2,825,464 | A | 3/1958 | Mack |
| 3,228,878 | A | 1/1966 | Moody |
| 3,288,292 | A | 11/1966 | Stone |
| 3,511,776 | A | 5/1970 | Avampato |
| 3,533,506 | A | 10/1970 | Carr |
| 3,539,009 | A | 11/1970 | Kudlaty |
| 4,050,426 | A | 9/1977 | Sanderson |
| 4,065,386 | A | 12/1977 | Rigby |
| 4,159,944 | A | 7/1979 | Erickson et al. |
| 4,209,359 | A | 6/1980 | Sethy |
| 4,250,040 | A | 2/1981 | LaRaus |

(Continued)

FOREIGN PATENT DOCUMENTS

EP  02124493  7/1984

(Continued)

OTHER PUBLICATIONS

Onyeche, et al., "Sludge Homogeisation as a Means to Reduce Sledge Volume and Increase Energy Production", Electronic Journal of Environmental, Agricultural and Food Chemistry, 2003, p. 291-296.

(Continued)

*Primary Examiner*—Peter A Hruskoci
(74) *Attorney, Agent, or Firm*—Meyertons, Hood, Kivlin, Kowert & Goetzel, P.C.; Eric B. Meyertons

(57) ABSTRACT

Systems and methods to treat wastewater are described herein. A wastewater treatment system may include a primary treatment system, a secondary treatment system, a disinfection treatment system, a solids treatment system, one or more fluid treatment systems, or combinations thereof.

16 Claims, 15 Drawing Sheets

U.S. PATENT DOCUMENTS

| | | |
|---|---|---|
| 4,251,627 A | 2/1981 | Calamur |
| 4,261,521 A | 4/1981 | Ashbrook |
| 4,265,746 A | 5/1981 | Zimmerman, Sr. et al. |
| 4,342,650 A | 8/1982 | Erickson et al. |
| 4,357,243 A | 11/1982 | Dobrez et al. |
| 4,412,924 A | 11/1983 | Feather |
| 4,422,934 A | 12/1983 | Debney et al. |
| 4,490,252 A | 12/1984 | Brigante |
| 4,512,289 A | 4/1985 | Collins |
| 4,519,919 A | 5/1985 | Whyte et al. |
| 4,526,324 A | 7/1985 | Stephanoff et al. |
| 4,532,040 A | 7/1985 | Meeks et al. |
| 4,533,254 A | 8/1985 | Cook et al. |
| 4,538,764 A | 9/1985 | Dunbar et al. |
| 4,555,253 A | 11/1985 | Hull et al. |
| 4,601,780 A | 7/1986 | Coggins et al. |
| 4,645,606 A | 2/1987 | Ashbrook et al. |
| 4,722,799 A | 2/1988 | Ashbrook |
| 4,726,686 A | 2/1988 | Wolf et al. |
| 4,764,283 A | 8/1988 | Ashbrook et al. |
| 4,816,061 A | 3/1989 | Walter et al. |
| 4,838,701 A | 6/1989 | Smith et al. |
| 4,883,603 A | 11/1989 | Roggenstein et al. |
| 4,908,154 A | 3/1990 | Cook et al. |
| 4,957,626 A | 9/1990 | Ashbrook et al. |
| 4,989,988 A | 2/1991 | Hutter et al. |
| 5,082,633 A | 1/1992 | Stuper |
| 5,106,022 A | 4/1992 | Pook et al. |
| 5,106,510 A | 4/1992 | Rieber |
| 5,114,576 A | 5/1992 | Ditzler et al. |
| 5,116,519 A | 5/1992 | Michaluk |
| 5,158,686 A * | 10/1992 | Kigel .................. 210/713 |
| 5,169,525 A | 12/1992 | Gerteis |
| 5,171,090 A | 12/1992 | Wiemers |
| 5,207,910 A | 5/1993 | Rieber |
| 5,232,584 A | 8/1993 | Wang et al. |
| 5,266,210 A | 11/1993 | McLaughlin |
| 5,318,702 A | 6/1994 | Ashbrook |
| 5,348,662 A | 9/1994 | Yen et al. |
| 5,352,276 A | 10/1994 | Rentschler et al. |
| 5,352,332 A | 10/1994 | Maples et al. |
| 5,367,116 A | 11/1994 | Frey |
| 5,435,913 A | 7/1995 | Ashbrook |
| 5,447,642 A | 9/1995 | Schenach |
| 5,482,369 A | 1/1996 | Verstallen |
| 5,508,250 A | 4/1996 | Miller et al. |
| 5,556,259 A | 9/1996 | Hlavenka |
| 5,573,738 A | 11/1996 | Ma et al. |
| 5,643,461 A | 7/1997 | Neff et al. |
| 5,709,730 A | 1/1998 | Cashman |
| 5,720,882 A | 2/1998 | Stendahl et al. |
| 5,769,939 A | 6/1998 | Dingsoyr et al. |
| 5,846,425 A | 12/1998 | Whiteman |
| 5,853,535 A | 12/1998 | Maples et al. |
| 5,927,852 A | 7/1999 | Serafin |
| 5,931,771 A | 8/1999 | Kozyuk |
| 5,938,892 A | 8/1999 | Maples et al. |
| 5,954,964 A | 9/1999 | Nielsen et al. |
| 6,013,183 A | 1/2000 | Stephenson et al. |
| 6,045,068 A | 4/2000 | Ashbrook |
| 6,204,225 B1 | 3/2001 | Lightcap |
| 6,234,445 B1 | 5/2001 | Yoon |
| 6,358,415 B1 * | 3/2002 | Leung .................. 210/205 |
| 6,361,753 B1 | 3/2002 | Cashman |
| 6,402,065 B1 | 6/2002 | Higgins |
| 6,428,599 B1 | 8/2002 | Cashman |
| 6,443,610 B1 | 9/2002 | Shechter et al. |
| 6,514,458 B1 | 2/2003 | Czechowski et al. |
| 6,555,002 B2 * | 4/2003 | Garcia et al. ............. 210/605 |
| 6,607,651 B2 | 8/2003 | Stiller |
| 6,635,178 B2 | 10/2003 | Bowman et al. |
| 6,645,713 B2 | 11/2003 | Saito |
| 6,649,059 B2 | 11/2003 | Romanyszyn et al. |
| 6,656,247 B1 | 12/2003 | Genik-Sas-Berezowsky et al. |
| 6,685,834 B1 | 2/2004 | Murthy et al. |
| 6,712,968 B2 | 3/2004 | Romanyszyn |
| 6,745,961 B2 | 6/2004 | Korstvedt |
| 6,764,213 B2 | 7/2004 | Shechter |
| 6,773,603 B2 | 8/2004 | Moorehead et al. |
| 6,797,170 B2 | 9/2004 | Romanyszyn |
| 6,811,698 B2 | 11/2004 | Romanyszyn |
| 6,811,712 B2 | 11/2004 | Romanyszyn |
| 6,827,861 B2 | 12/2004 | Kerfoot |
| 6,866,703 B2 | 3/2005 | Mazzei |
| 6,951,618 B2 | 10/2005 | Rossmoore |
| 7,045,542 B1 | 5/2006 | Beilfuss et al. |
| 7,087,178 B2 | 8/2006 | Romanyszyn et al. |
| 7,247,242 B1 | 7/2007 | Moore et al. |
| 7,254,879 B2 | 8/2007 | Romanyszyn et al. |
| 7,422,695 B2 | 9/2008 | Foret |
| 7,485,671 B2 | 2/2009 | Qiu et al. |
| 2002/0196702 A1 | 12/2002 | Shechter |
| 2006/0257969 A1 | 11/2006 | Hug |
| 2006/0272624 A1 | 12/2006 | Pettersson |
| 2008/0061008 A1 | 3/2008 | Kelsey et al. |
| 2008/0257411 A1 | 10/2008 | Kelsey et al. |
| 2008/0257828 A1 | 10/2008 | Kelsey et al. |
| 2008/0257974 A1 | 10/2008 | Kelsey et al. |
| 2008/0289502 A1 | 11/2008 | Betting et al. |
| 2009/0152212 A1 | 6/2009 | Kelsey et al. |

FOREIGN PATENT DOCUMENTS

| | | |
|---|---|---|
| JP | 2001314888 | 11/2001 |
| JP | 2005238000 | 8/2005 |
| KR | 20020090820 | 12/2002 |
| WO | 0204124 | 1/2002 |
| WO | 0242002 | 5/2002 |
| WO | 2005058760 | 6/2005 |

OTHER PUBLICATIONS

Fairey, et al., "Evaluation of Kady Biolysis System (BLSTM) at the Plum Island Wastewater Treatment Plant", Mar. 4, 2004, p. 1-16, available from Charleston Water System website at http://www.charlestonwater.com/public_info_research_papers.htm.

PCT Application No. PCT/US2008/060915, Search Report, Mailed Sep. 30, 2008.

PCT Application No. PCT/US2008/060916, Search Report, Mailed Sep. 30, 2008.

PCT Application No. PCT/US2008/060918, Search Report, Mailed Sep. 30, 2008.

Office Action issued On Sep. 15, 1993 for U.S. Appl. No. 07/900,130.

Office Action issued On Aug. 8, 1989 for U.S. Appl. No. 07/089,071.

Office Action issued On Jan. 26, 1990 for U.S. Appl. No. 07/089,071.

Office Action issued On Aug. 14, 1987 for U.S. Appl. No. 07/018,049.

Office Action issued on Feb. 27, 1986 for US U.S. Appl. No. 06/726429.

Office Action issued On Jul. 2, 1980 for U.S. Appl. No. 06/126,345.

Office Action issued On Nov. 30, 2005 for U.S. Appl. No. 10/669,019.

Office Action issued On Dec. 12, 2006 for U.S. Appl. No. 10/668,123.

Office Action issued On Dec. 5, 2002 for U.S. Appl. No. 10/016,491.

Office Action issued On Mar. 5, 2003 for U.S. Appl. No. 10/016,491.

Office Action issued On Nov. 5, 2002 for U.S. Appl. No. 09/899,467.

Office Action issued On Feb. 12, 2003 for U.S. Appl. No. 09/899,467.

Office Action issued On Jul. 16, 2003 for U.S. Appl. No. 09/899,467.

Office Action issued On Feb. 17, 1999 for U.S. Appl. No. 08/991,667.

Office Action issued On Apr. 13, 1999 for U.S. Appl. No. 08/991,667.

Office Action issued On Aug. 26, 1999 for U.S. Appl. No. 08/991,667.

Co-pending U. S. Appl. No. 11/736,994 entitled "Systems and Methods for Treatment of Groundwater", to Kelsey et al., filed Apr. 18, 2007; available in PAIR.

PCT Application No. PCT/US2002/004124, Search Report, Completed Sep. 30, 2002.

PCT Application No. PCT/US2002/042002, Search Report, Mailed Apr. 12, 2002.

Communication, EPO Application No. 01950877.9-2307; dated Jun. 26, 2009 (S1).

Communication, EPO Application No. 01950877.9-2307; dated Mar. 3, 2007 (S2).

U.S. Patent and Trademark Office, "Office Action" for U.S. Appl. No. 11/519,986 mailed Mar. 17, 2009, available in PAIR.

U.S. Patent and Trademark Office, "Office Action" for U.S. Appl. No. 11/736,984 mailed Mar. 19, 2009, available in PAIR.

U.S. Patent and Trademark Office, "Office Action" for U.S. Appl. No. 11/737,006 mailed Mar. 18, 2009, available in PAIR.

U.S. Patent and Trademark Office, "Office Action" for U.S. Appl. No. 11/736,948 mailed Mar. 17, 2009, available in PAIR.

* cited by examiner

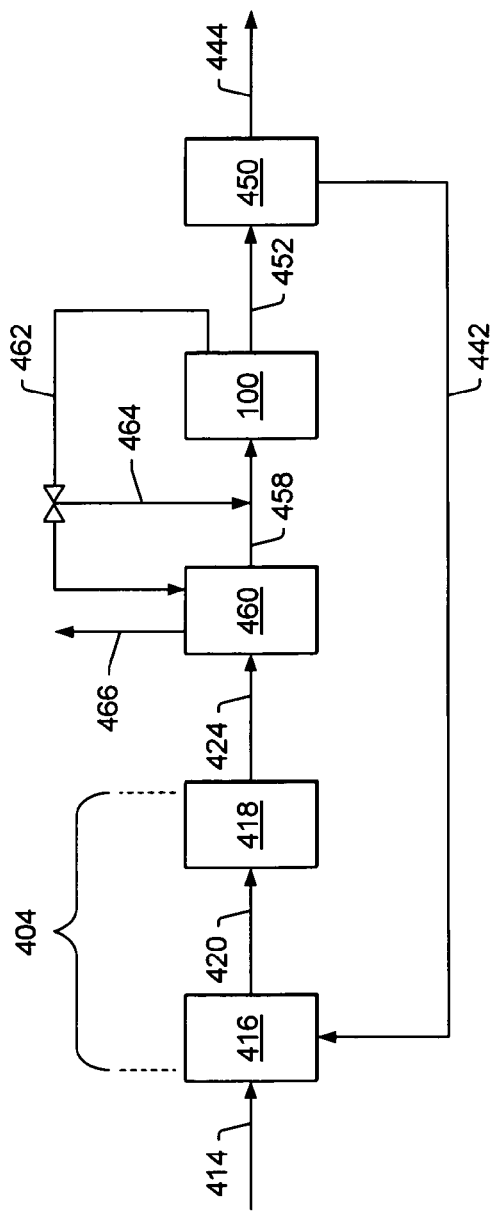
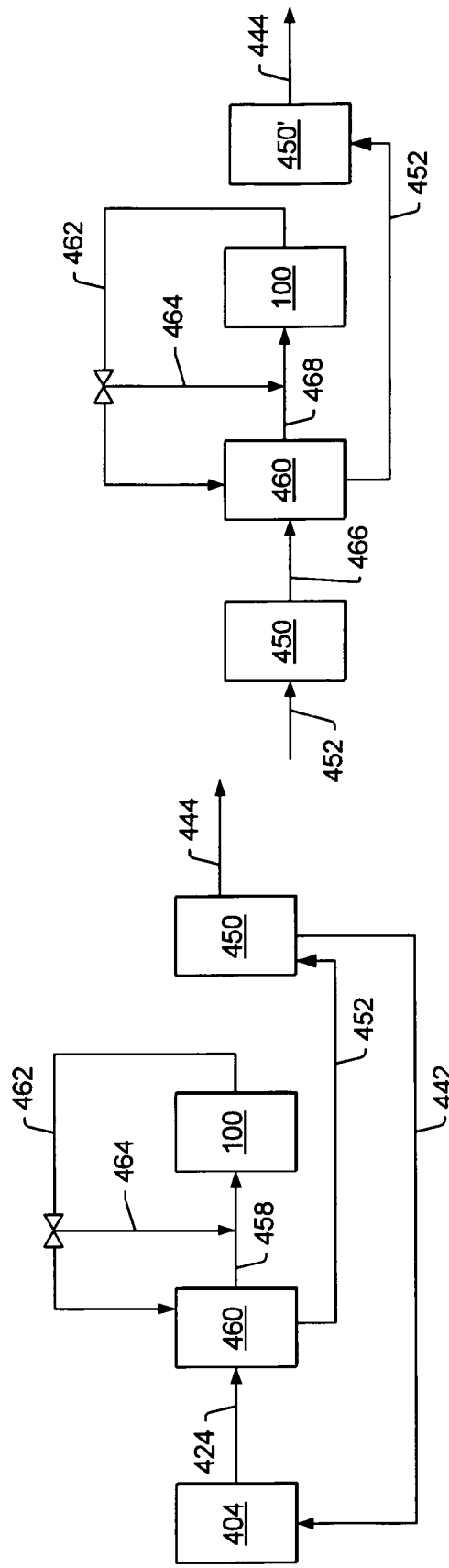
FIG. 20A
FIG. 20B
FIG. 20C

METHODS FOR TREATMENT OF WASTEWATER

PRIORITY CLAIM

This application claims the benefit of U.S. Provisional Application No. 60/901,814 entitled "Systems and methods for Treatment of Wastewater," filed Feb. 13, 2007.

BACKGROUND

1. Field of the Invention

The present invention relates to treating wastewater. More particularly, the invention relates to treating wastewater using a hydrodynamic cavitation system.

2. Brief Description of the Related Art

Primary objectives in the wastewater treatment industry include improving the influent quality, improving the treated effluent quality, complying with effluent limitations, and seeking more effective and efficient treatment, notably in the removal of inorganic constituents. The majority of these objectives are being met; however, a byproduct of these efforts has been the increased generation of solids and biological contaminants. In many cases, the increase in solids production has severely challenged existing solids processing and disposal methods.

Wastewater treatment facilities are well known in the art. The basic function of a wastewater treatment facility is to treat contaminated water (e.g., raw wastewater) to produce water that may be potable and/or discharged to lakes, rivers and streams. Challenges for wastewater treatment facilities include disposal of solids (e.g., sludge and/or biosolids) and/or removal of contaminants from the wastewater. Increased production of sewage, environmental impacts, and regulations regarding disposal of the sewage have made the disposal of solids and/or removal of contaminants from the wastewater more challenging.

Solids may include a significant amount of water that increases the cost of disposal of the solids. For example, solids collected from a wastewater treatment process often include approximately 30% by weight solid contaminants from the wastewater. Currently, there is a limitation to the amount of water and/or fluids that can be removed from solids using conventional wastewater thickening and dewatering processes since a significant amount of the water and/or fluids remains trapped in the solids (e.g., in cells).

Wastewater may also include a significant amount of agricultural chemicals. The composition and quantity of chemicals produced from used agriculture and/or horticulture processes (for example, herbicides, pesticides, insecticides) may make removing the chemicals from wastewater using current wastewater processing techniques difficult. Runoff and increasing urbanization may also provide additional sources of pollution not currently controlled by wastewater treatment facilities.

The following patents and publications describe existing techniques for treating wastewater: U.S. Pat. Nos. 6,745,961 to Korstvedt; 6,685,834 to Murthy et al.; 6,635,178 to Bowman et al.; 6,402,065 to Higgins; 6,013,183 to Stephenson et al.; 5,954,964 to Nielsen et al.; 5,846,425 to Whiteman; 5,643,461 to Neff et al.; 5,232,584 to Wang et al.; 4,342,650 to Erickson et al.; and 4,159,944 to Erickson et al.; Onyeche et al. "Sludge Homogenization as a Means to Reduce Sludge Volume and Increase Energy Production," *Electron. J. Environ. Agric. Food Chem.*, 2003, pp. 291-296; Fairey et al. "Evaluation of Kady Biolysis System (BLS™) at the Plum Island Wastewater Treatment Plant", Mar. 4, 2004, p. 1-16; and U.S. Office of Waste and Office of Wastewater Management "Primer for Municipal Wastewater Treatment Systems," EPA 832-R-04-001, September 2004, all of which are incorporated by reference herein.

Many wastewater treatment facilities are undersized and/or overutilized, thus handling the volume and/or removing the chemical contaminants and processing solids in an efficient manner is difficult. Thus, there is a need for new technology that is compatible with existing wastewater treatment facilities that can remove contaminants and/or reduce the amount of solids being produced from the wastewater facility.

SUMMARY

Systems and methods to treat wastewater are described herein. In some embodiments, a wastewater treatment system may include a primary treatment system, a secondary treatment system, a disinfection treatment system, a solids treatment system, one or more fluid treatment systems, or combinations thereof.

In some embodiments, a wastewater treatment system includes one or more fluid treatment systems and a primary treatment system. The primary treatment system may be coupled to the fluid treatment system. In some embodiments, a settling tank of the primary treatment system is coupled to an inlet of a fluid treatment system. Processing of the wastewater in the fluid treatment system may kill and/or at least partially destroy microorganisms, including pathogenic species, in the wastewater. In some embodiments, contact of the wastewater stream in the fluid treatment system aerates at least a portion of the wastewater stream. An outlet of the fluid treatment system may be coupled to a secondary treatment system. The secondary treatment system may be coupled to a disinfection treatment system and/or a solids treatment system.

In some embodiments, a secondary treatment system includes one or more fluid treatment systems. In some embodiments, one or more fluid treatment systems are coupled to one or more units of a secondary treatment system. In some embodiments, contact of the wastewater stream in the fluid treatment system aerates at least a portion of the wastewater stream and/or changes a size of particulates in the wastewater stream.

In certain embodiments, a disinfection treatment system includes one or more fluid treatment systems. In some embodiments, one or more fluid treatment systems are coupled to one or more units of a disinfection treatment system. Processing chlorinated water in one or more fluid treatment systems may dechlorinate at least a portion of the chlorinated water. In some embodiments, the chlorinated water is obtained from a secondary treatment system.

In some embodiments, a wastewater treatment system includes a solids treatment system and one or more fluid treatment systems coupled to the solids treatment system. In some embodiments, a solids treatment system includes one or more fluid treatment systems. In some embodiments, a fluid treatment system receives sludge from a secondary treatment system and/or disinfectant system. Processing the sludge in the fluid treatment system kill and/or at least partially destroy a portion of biological contaminants in the sludge, remove water from the sludge, remove volatile organic compounds from the sludge, or combinations thereof to produce biosolids. The biosolids may have a total solids content of at least 1% by weight. In some embodiments, a least a portion of the treated sludge stream is recycled to a reservoir and/or a secondary treatment system.

In some embodiments, a fluid treatment system includes one or more vortex nozzle units. Each vortex nozzle unit may include a single pair of vortex nozzles or multiple vortex nozzle units. In some embodiments, a pair of opposed vortex nozzles (a first vortex nozzle and a second vortex nozzle) are used in a fluid treatment system. In an embodiment of a fluid treatment system, the first vortex nozzle unit has a plurality of vortex nozzles. When a vortex nozzle unit includes a plurality of vortex nozzles, the vortex nozzles may be arranged in a cascade configuration. In some embodiments, a fluid treatment system includes a screen coupled to the inlet of the fluid treatment system.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which:

FIGS. 20A-20C depict schematics of embodiments of wastewater treatment facilities that includes recycling sludge through a fluid treatment system.

Figure 1:
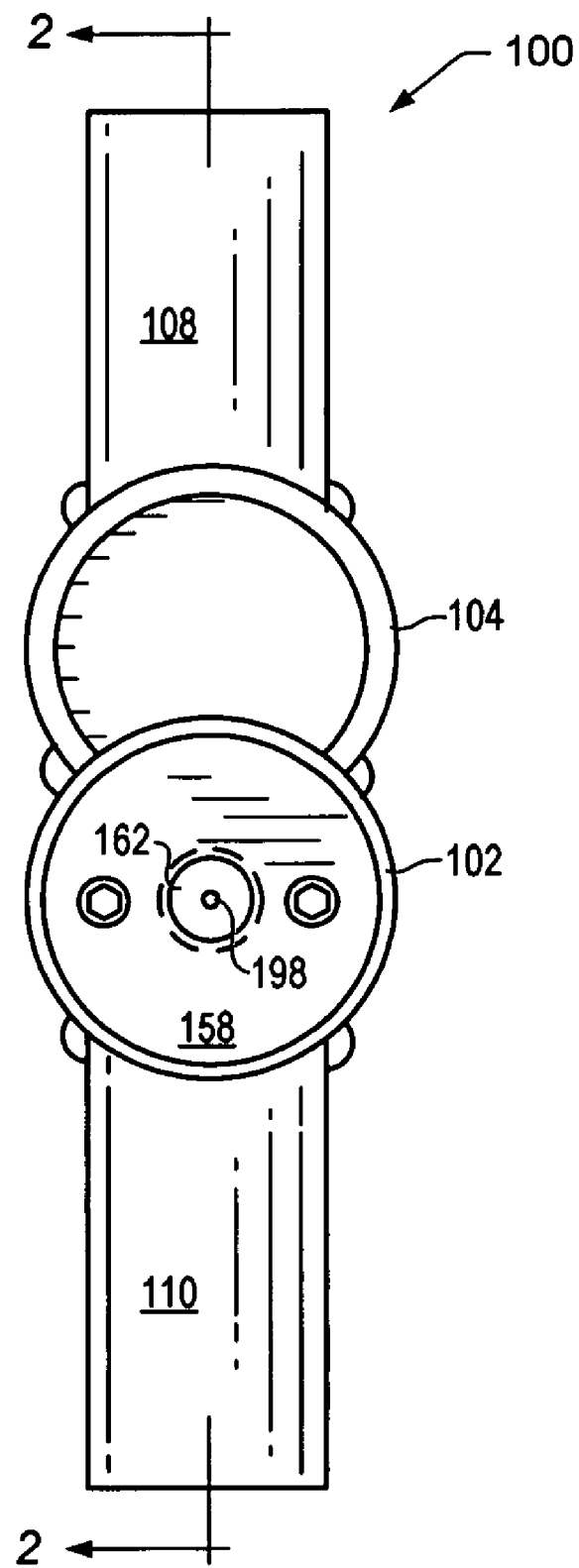
FIG. 1 depicts a top view of an embodiment of a fluid treatment system.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

Systems and methods for treating wastewater to produce clean effluent and biosolids are described herein. Selected terms used herein are listed below.

"Activated sludge" refers to sewage that is treated with air and microorganisms to break down organic matter in the sewage.

"Activated sludge process" refers to a process for removing organic matter from sewage using microorganisms.

"Aeration" refers to the process of injecting air and/or oxygen into a system to increase the concentration of oxygen in the system "Aerobic" refers to a life or process that occurs in the presence of oxygen.

"Anaerobic" refers to a life or a process that occurs in the absence of added oxygen.

"Bacteria" refers to certain types of microscopic living organisms. Bacteria may help consume organic constituents of sewage.

"Biochemical oxygen demand" (BOD) is a measure of the amount of oxygen consumed in biological processes that break down organic matter.

"Biological contaminants" refer to bacteria, pathogens and/or other types of microorganisms that are not involved in decomposition of organic materials in sewage.

"Biosolids" refer to sludge that has been treated to destroy pathogenic microorganisms.

"Denitrification" refers to the reduction of nitrate ($NO_3$) or nitrite ($NO_2$) to nitrogen gas.

"Deflocculation" refers to a process by which solids are reduced in size.

"Disinfection" refers to treatment of water to kill or deactivate pathogens.

"Effluent" refers to treated fluid that exits in a wastewater treatment system after completion of the treatment process.

"Fluid" refers to any flowable liquid, gas, or solid particulates deliverable under pressurized gas or liquid flow.

"Hydrodynamic cavitation" refers to a process where cavities and cavitation bubbles filled with a vapor and/or a gas mixture are formed inside fluid flow.

"Lyses" refers to the partial destruction or complete destruction of cells by breaking down of the cell wall.

"Microbial" refers to bacteria, algae, fungi, microorganisms, or mixtures thereof.

"Microorganism" refers to an organism that is too small to be seen by the unaided eye but large enough to be seen under a microscope. Microorganisms include bacteria fungi, some algae, and protozoans but not viruses.

"Nitrification" refers to a process whereby ammonia ($NH_3$) or ammonium ions ($NH_4^+$) are oxidized to form nitrate ($NO_3$).

"Pathogens" refer to disease-causing organisms. Examples of pathogens include, but are not limited to, pathogenic bacteria, viruses, helminthes protozoans, or mixtures thereof.

"Polymer" refers to long chain organic compounds produced by the joining of primary organic compounds called monomers.

"Primary treatment" refers to an initial stage of wastewater treatment that separates floating material and some solid materials from a wastewater stream.

"Receiving water bodies" refers to water bodies that receive discharges of treated or untreated wastewater. Examples of water bodies include, but are not limited to, rivers, lakes, oceans, and other natural and man made bodies of water.

"Secondary treatment" refers to a second stage in a wastewater treatment system in which bacteria consume organic matter in a wastewater stream.

"Sedimentation tank" refers to one or more tanks in which floating material are skimmed off and/or settled solids are removed from a wastewater stream.

"Sludge" refers to a combination of biological organisms and solid material.

"Streams" refer to a stream or a combination of streams. The term fluid and/or stream may be used interchangeably.

"Water treatment components" refers to components that separate contaminants from a wastewater stream. Examples of water treatment components include, but are not limited to primary treatment systems, secondary treatment systems, and disinfectant systems. The separated waste components may be in the form of a sludge.

"Wastewater" refers to liquid and/or water transported wastes removed from residences, institutions, commercial establishments, industrial establishments, surface water, storm water, or combinations thereof.

It is to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a nozzle" includes a combination of two or more nozzles and reference to "bacteria" includes mixtures of different types of bacteria.

A wastewater treatment facility treats wastewater to produce potable water, effluent, and biosolids. The treatment process typically includes a) removal of solids; b) transformation (e.g., oxidization) of dissolved and particulate biodegradable constituents into acceptable end products; c) capture and incorporation of suspended and nonsettleable colloidal solids into a biological floc or biofilm; d) transform or remove nutrients, such as nitrogen and phosphorus; and e) in some cases, the removal of specific trace organic constituents and compounds. By means of biological processes (e.g., biological respiration and synthesis) occurring in wastewater treatment facilities, most of the organic material received is converted to carbon dioxide, water and biosolids.

Treatment of raw wastewater may include passing the raw wastewater through a primary treatment system, a secondary treatment system, and a disinfection system to produce potable water and clean effluent. The clean effluent may be discharged into one or more receiving water bodies. In the primary treatment system, the wastewater passes through a settling tank. In the settling tank, floating material and/or material that has settled out from the wastewater is separated from the wastewater.

During the secondary treatment process, the wastewater is subjected to biological processes to produce water, carbon dioxide and sludge. These processes include, but are not limited to, waste activated sludge process, sequence batch reactors (SBRs), microbiological reactors (MBRs), and oxidization ditches. All of these processes produce sludge that may be further processed to biosolids.

The sludge may be transported to a solids treatment system to be reduced to biosolids. A water content of the sludge may be reduced so that the biosolids can be converted into recoverable energy (e.g., burned) and/or recycled (e.g., biosolids may be recycled into landscaping, gardening, soil improvement, land reclamation, forestry and/or agriculture processes). Processing of the sludge to biosolids may account for about 40% to 60% of the total operating costs of the wastewater treatment facility, thus a need for cost effective technology that reduces the mass and volume of biosolids is needed. Incorporating one or more fluid treatment systems in wastewater facilities may efficiently reduce the mass and volume of biosolids, thus lowering the overall operation costs for the wastewater treatment facilities. In some embodiments, the fluid treatment system may be a hydrodynamic cavitation system marketed by VRTX Technologies (Schertz, Tex.).

In some embodiments, one or more fluid treatment systems may be included in a primary treatment system, a secondary treatment system, a disinfection system, or a solids treatment system. In certain embodiments, a fluid treatment system may be positioned near or adjacent to the primary treatment system, a secondary treatment system, a disinfection system, or a solids treatment system.

In certain embodiments, at least a portion of one or more streams produced in a wastewater treatment system may be treated in one or more fluid treatment systems. One or more streams produced in a wastewater treatment system include, but are not limited to, a waste stream, a water stream, a sludge stream, a biosolids stream, a chlorinated water stream, or mixtures thereof.

In certain embodiments, a fluid treatment system includes a first vortex nozzle unit positioned in opposed relationship to a second vortex nozzle unit, and a pressure-equalizing chamber that delivers a flow of a stream to each of the nozzle units. As used herein the term "vortex nozzle unit" refers to a single vortex nozzle or a plurality of vortex nozzles coupled together. The pressure-equalizing chamber receives a stream from a pump and delivers the stream into the first vortex nozzle unit and the second vortex nozzle unit. The first and second vortex nozzle units receive the stream therein and impart rotation to the stream, thereby creating a first rotating stream and a second rotating stream, respectively. The fluid treatment system further includes a collision chamber where impingement of the first rotating stream flow with the second rotating stream flow occurs.

In some embodiments, a fluid treatment system may include two sets of opposed cascaded vortex nozzles. For example, a vortex nozzle unit may include a cascaded vortex nozzle pair, which includes a first vortex nozzle having a second vortex nozzle cascaded within it. The vortex nozzle unit further includes a second cascaded vortex nozzle pair, which includes a third vortex nozzle having a fourth vortex nozzle cascaded within it. More particularly, the outlet from the second nozzle communicates with an inlet into the first nozzle and the outlet from the fourth nozzle communicates with an inlet into the third nozzle. Each of the four vortex nozzles receives a fluid through an inlet that communicates with a stream to impart a rotation to the stream passing through the nozzles. The cascaded vortex nozzles are positioned in opposed relation and communicate with a chamber so that the streams exiting the nozzles rotate in opposite directions to collide at approximately the mid-point of the chamber. The two counter-rotating streams exiting the nozzles collide at high velocity to create a compression wave throughout the fluid.

Hydrodynamic cavitation systems and other fluid treatments systems are described in U.S. Pat. Nos. 4,261,521 to Ashbrook; 4,645,606 to Ashbrook et al.; 4,764,283 to Ashbrook et al.; 4,957,626 to Ashbrook; 5,318,702 to Ashbrook; 5,435,913 to Ashbrook; 6,045,068 to Ashbrook; 6,649,059 to Romanyszyn et al; 6,712,968 to Romanyszyn; 6,797,170 to Romanyszyn; 6,811,698 to Romanyszyn; and 6,811,712 to Romanyszyn, all of which are incorporated by reference herein.

Figure 2:
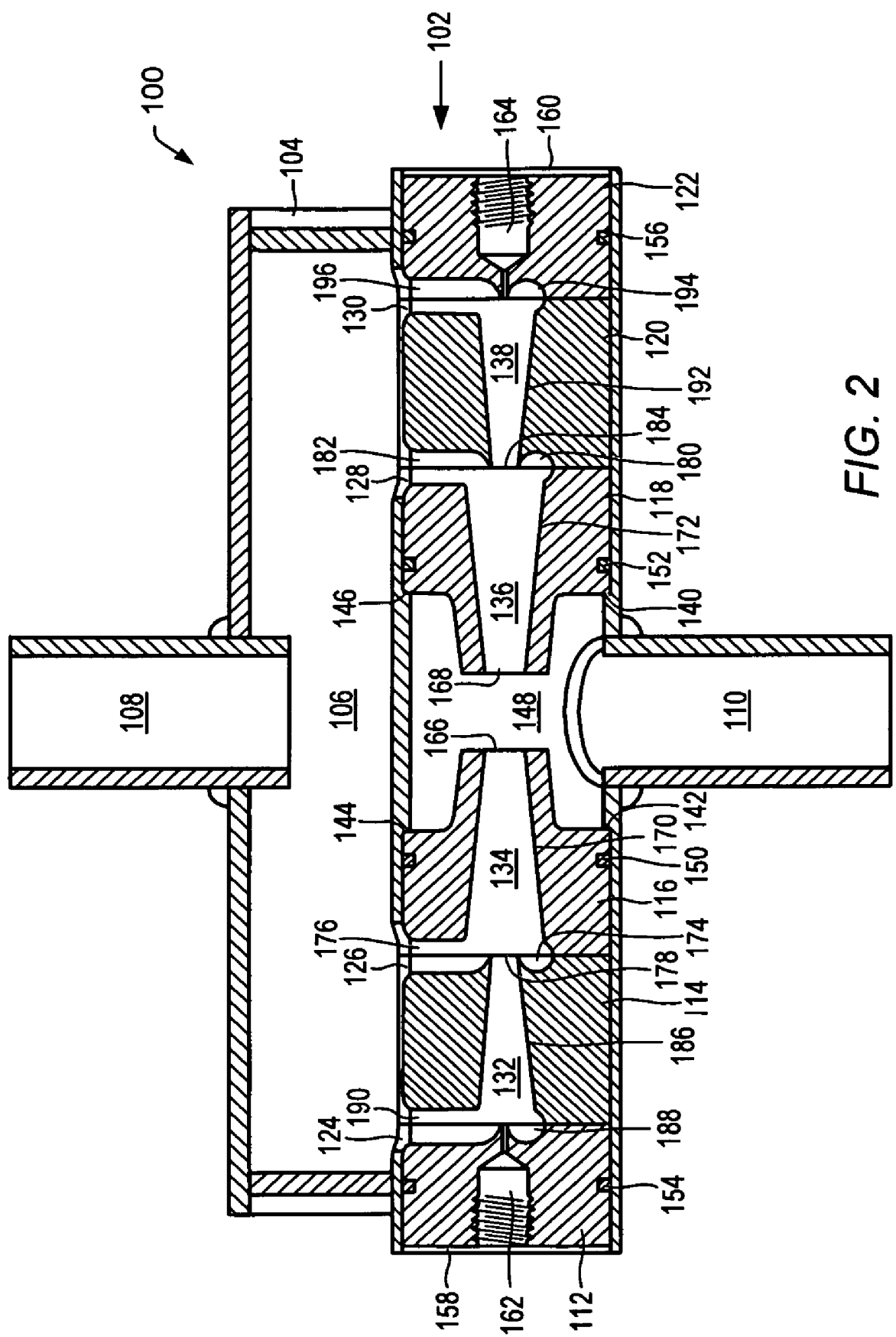
FIG. 2 is a cross-sectional view of the fluid treatment system depicted in FIG. 1 taken substantially along line 2-2.

FIGS. 1 and 2 depict an embodiment of a fluid treatment system. Fluid treatment system 100 includes cylindrical body portions 102 and 102 formed integrally using any standard machining or molding process. Cylindrical body portion 104 defines chamber 106 and includes inlet 108 which may be attached to a stream source. Cylindrical body 102 defines a chamber and includes outlet 110 that attaches to any suitable conduit, reservoir, or any suitable fluid delivery means.

Cylindrical body portion 102 houses within its chamber vortex nozzle assembly blocks 112, 114, 116, 118, 120, and 122 (see FIG. 2). Additionally, cylindrical body 102 includes inlets 124, 126, 128, and 130 which communicate with chamber 106 of cylindrical body portion 104. The structure of vortex nozzle assembly blocks 112, 114, 116, 118, 120, and 122 are similar to those described in U.S. Pat. Nos. 4,261,521 to Ashbrook; 4,957,626 to Ashbrook et al., and 5,318,702 to Ashbrook. Each of vortex nozzle assembly blocks 112, 114, 116, 118, 120, and 122 are shaped using any standard machining or molding process to define a portion of vortex nozzles 132, 134, 136, and 138. Vortex assembly blocks 112, 114, and 116 define the first vortex nozzle unit and vortex assembly blocks 118, 120, and 122 define the second vortex nozzle unit.

Vortex nozzle assembly blocks 116 and 118 are inserted within the chamber defined by cylindrical body portion 102 until their inner edges contact ledges 140, 142 in body portion 102. Ledges 144 and 146 prevent vortex nozzle assembly blocks 120 and 122 from being inserted in the center of the chamber defined within cylindrical body portion 102. Vortex nozzle assembly blocks 116 and 118 reside within cylindrical body portion 102 such that they define chamber 148, which communicates with outlet 110. Vortex nozzle assembly blocks 116 and 118 include o-rings 150 and 152, respectively, which form a fluid seal between vortex nozzle assembly blocks 116 and 118 and the inner surface of cylindrical body portion 102.

After the insertion of vortex nozzle assembly blocks 116 and 118 to the position shown in FIG. 2, vortex nozzle assembly blocks 114 and 120 are inserted until they abut the rear portions of vortex nozzle assembly blocks 116 and 118, respectively. Finally, vortex nozzle assembly blocks 112 and 122 are inserted until they abut the rear portions of vortex nozzle assembly blocks 114 and 120, respectively. Vortex nozzle assembly blocks 112 and 122 include o-rings 154 and 156, respectively, which form a fluid seal between vortex nozzle assembly blocks 112 and 122 and the inner surface of cylindrical body portion 102.

Cylindrical body portion 102 includes plates 158 and 160 that fit within the entrances at either end of the cylindrical body portion. Plates 158 and 160 mount over vortex nozzle assembly blocks 112 and 122, respectively, using any suitable means (e.g., screws) to secure vortex nozzle assembly blocks 112, 114, 116, 118, 120, and 122 with the chamber defined by cylindrical body portion 102.

With vortex nozzle assembly blocks 112, 114, 116, 118, 120, and 122 positioned and secured within the chamber defined by cylindrical body portion 102, vortex nozzle assembly blocks 112, 114, 116, 118, 120, and 122 define vortex nozzles 132, 134, 136, and 138 and conduits 162 and 164. Vortex nozzles 134 and 136 are positioned in opposed relation so that a stream of water exiting their outlets 166 and 168, respectively, will collide approximately at the mid-point of chamber 148. Vortex nozzle assembly blocks 116 and 118 define frustro-conical inner surfaces 170 and 172 of vortex nozzles 134 and 136, respectively. The abutment of vortex nozzle assembly block 116 with vortex nozzle assembly block 114 defines circular portion 174 and channel 176, which communicates with inlet 126. Additionally, outlet 178 from vortex nozzle 132 communicates with circular portion 174 of vortex nozzle 134. Similarly, vortex nozzle blocks 118 and 120 define circular portion 180 and channel 182, which communicates with inlet 128, while outlet 184 from vortex nozzle 138 communicates with circular portion 180 of vortex nozzle 136.

Vortex nozzle assembly block 114 defines frustro-conical inner surface 186, while the abutment between vortex nozzle assembly blocks 112 and 114 defines circular portion 188 and channel 190, which communicates with inlet 124. Vortex nozzle assembly block 120 defines frustro-conical inner surface 192 and the abutment between vortex nozzle assembly blocks 120 and 122 defines circular portion 194 and channel 196, which communicates with inlet 130. Vortex nozzle assembly blocks 112 and 122 include conduits 162 and 164, respectively, which communicate to the exterior of cylindrical body portion 102 via opening 198 in plate 158 (see FIG. 1) and another opening in plate 160 (not shown). Conduits 162 and 164 permit additives to be introduced into vortex nozzles 132, 134, 136, and 138 during treatment of a fluid.

In operation, fluid is pumped into chamber 106 via inlet 108. The fluid flows from chamber 106 into channels 190, 176, 182, and 196 via inlets 124, 126, 128, and 130, respectively. Channels 190, 176, 182, and 196 deliver the fluid to circular portions 188, 174, 180, and 194, respectively, of vortex nozzles 132, 134, 136, and 138. Circular portions 188, 174, 180, and 194 impart a circular rotation to the water and deliver the circularly rotating water streams into frustro-conical inner surfaces 186, 170, 172, and 192, respectively. Frustro-conical inner surfaces 186, 170, 172, and 192 maintain the circular rotation in their respective water stream and deliver the circularly rotating water streams to outlets 178, 166, 168, and 184, respectively, from vortex nozzles 132, 134, 136, and 138.

Due to the cascaded configuration of vortex nozzles 132 and 138, the water streams exiting outlets 178 and 184 enter vortex nozzles 134 and 136, respectively. Those circularly rotating streams combine with the circularly rotating streams within vortex nozzles 134 and 136 to increase the velocity of the circularly rotating streams therein. Additionally, as the streams exiting vortex nozzles 132 and 138 contact the streams within vortex 134 and 136, they strike the circularly rotating streams within vortex nozzles 134 and 136 such that they create compression waves therein.

The combined streams from vortex nozzles 132 and 134 and the combined streams from vortex nozzles 138 and 136 exit vortex nozzles 134 and 136 at outlets 166 and 168, respectively, and collide at approximately the mid-point of chamber 148. The streams are rotating oppositely as they exit vortex nozzles 134 and 136 because vortex nozzles 134 and 136 are positioned in an opposed relationship. As the exiting streams collide, additional compression waves are created which combine with the earlier compression waves to create compression waves having amplitudes greater than the original waves. The recombined water streams exit chamber 148 into outlet 110. The compression waves created by the collision of the exiting streams are sufficient to destroy at least a portion of biological contaminants present in the stream entering inlet 108. The compression waves are sufficient to reduce a size of particles in a stream, vaporize volatile materials, and/or compress particulate matter such that liquid is removed from the particulate matter.

Although the above description depicts a pair of cascaded nozzles, such description has been for exemplary purposes only, and, as will be apparent to those of ordinary skill in the art, any number of vortex nozzles may be used.

Figure 3:
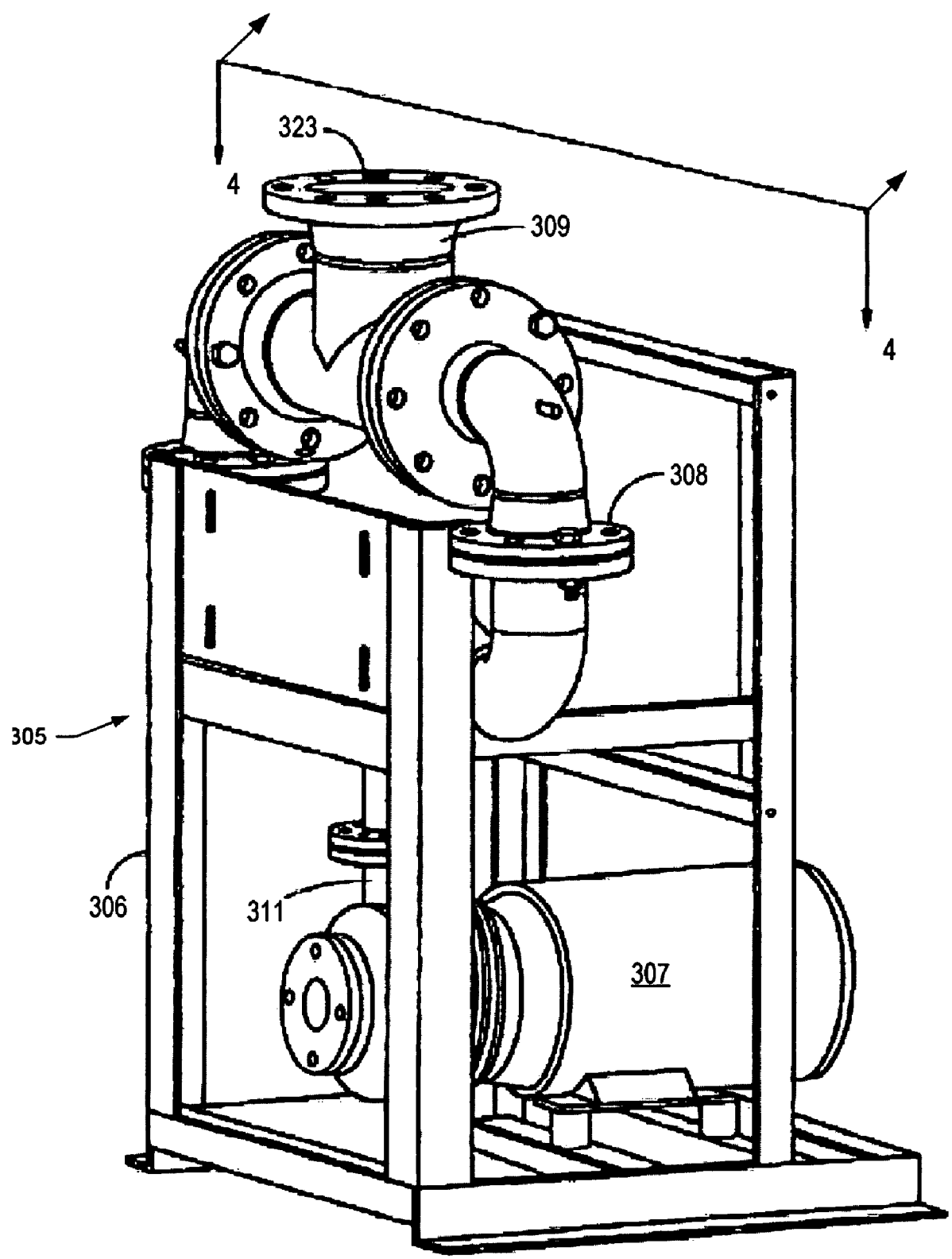
FIG. 3 is a perspective view of a fluid treatment system.
Figure 4:
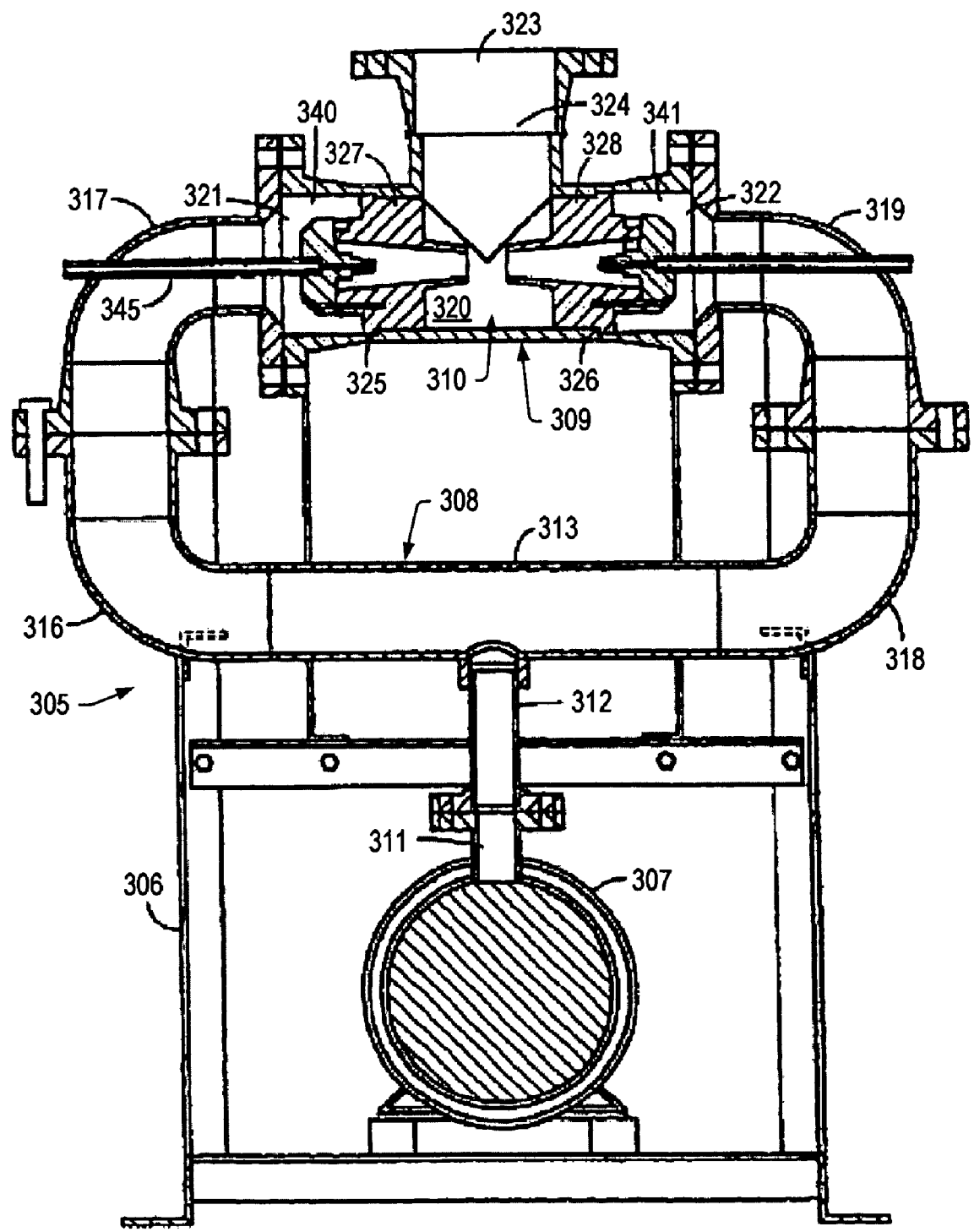
FIG. 4 is a cross-sectional view of the fluid treatment system depicted in FIG. 3 taken substantially along plane 4-4.
Figure 5:
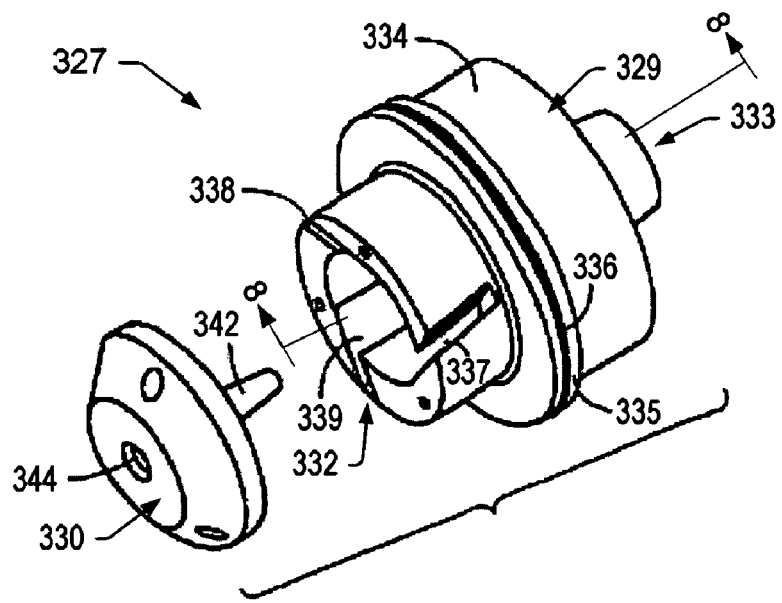
FIG. 5 is a perspective view illustrating a vortex nozzle of the apparatus for treating fluids.
Figure 6:
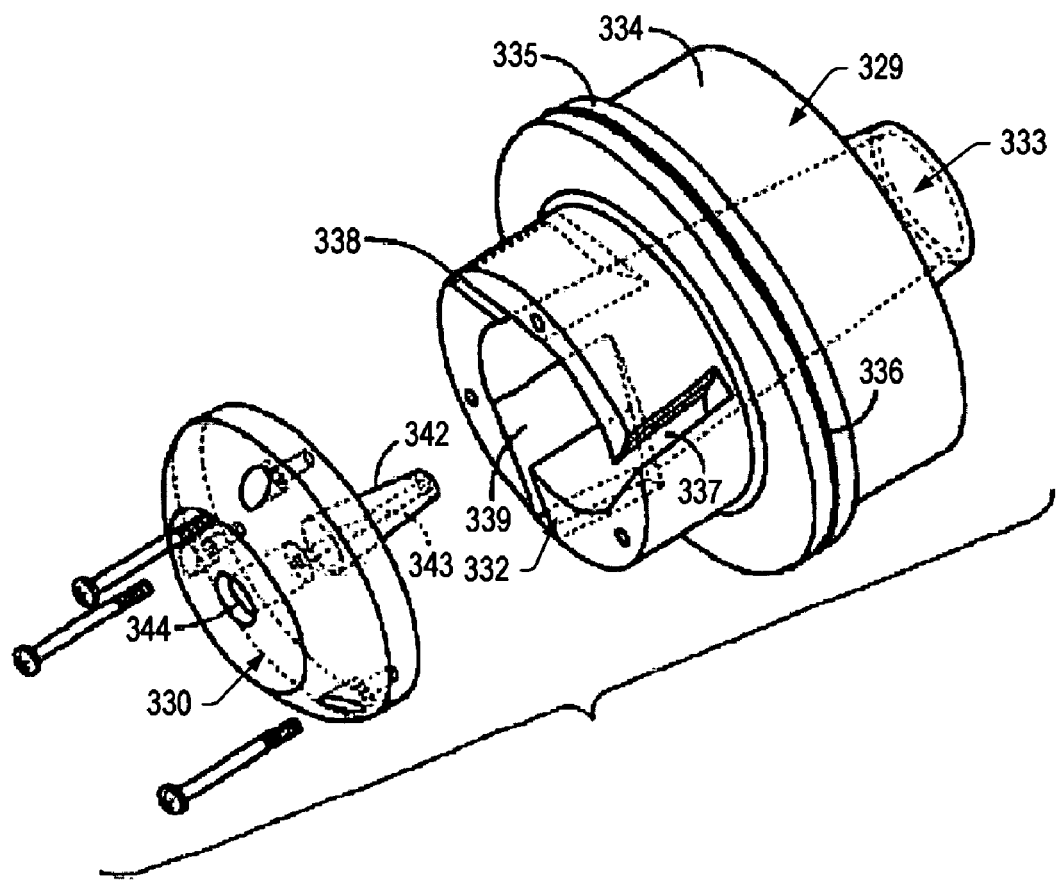
FIG. 6 is an alternate perspective view illustrating a vortex nozzle of the apparatus for treating fluids.
Figure 7:
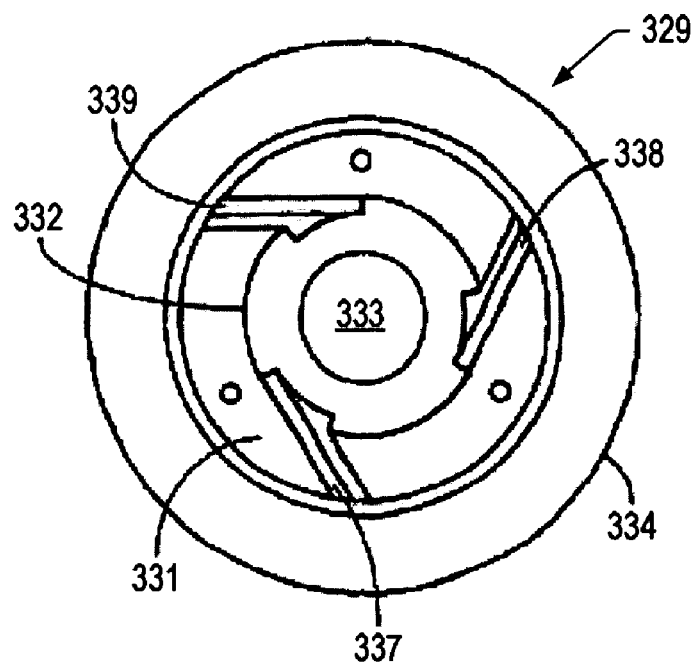
FIG. 7 is an end view illustrating an inlet side of a vortex nozzle body of the vortex nozzle.
Figure 8:
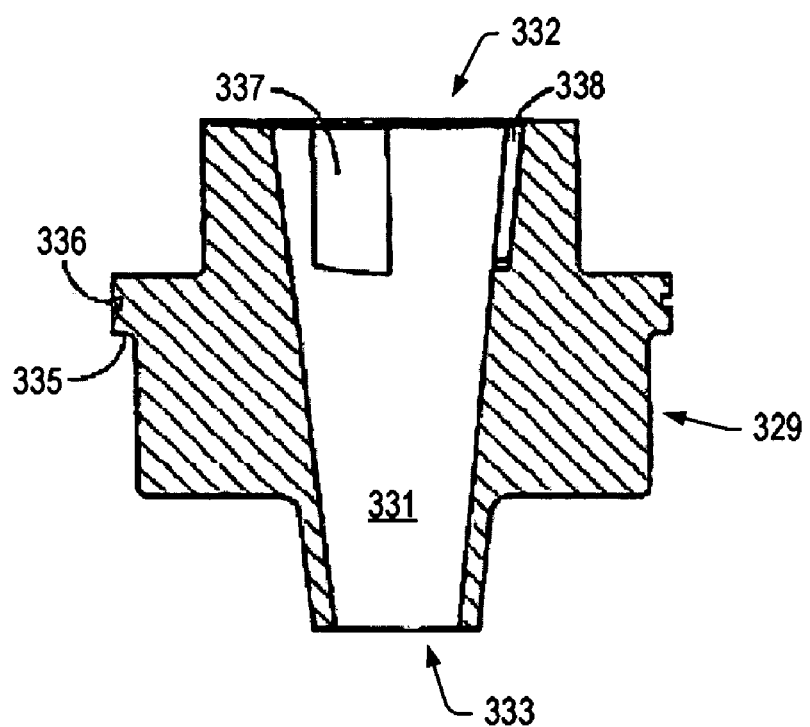
FIG. 8 is a cross-sectional view of FIG. 5 taken substantially along lines 8-8 illustrating the vortex nozzle body of the vortex nozzle.

FIGS. 3 and 4 depict an embodiment of a fluid treatment system. Apparatus 305 includes frame 306 for supporting pump 307 and manifold 308. Pump 307 and manifold 308 may be coupled to frame 306 using any suitable coupling means (e.g., brackets). Apparatus 305 may includes housing 309 secured to manifold 308 and vortex nozzle assembly 310. Vortex nozzle assembly 310 is disposed in housing 309.

Pump 307 includes outlet 311 and is any suitable pump capable of pumping fluid from a fluid source through apparatus 305. As shown, pump 307 delivers fluids, however those of ordinary skill in the art will recognize many other suitable and equivalent means for delivering fluids, such as pressurized gas canisters may be used.

Manifold 308 includes inlet 312, diverter 313, and elbows 316, 317, 318, and 319. Inlet 312 couples to outlet 311 of pump 307 using any suitable means (e.g., flange and fasteners) to receive fluid flow from the pump. Inlet 312 fits within an inlet of diverter 313 and is held therein by friction, threading, welding, glue, or the like, to deliver fluid into the diverter. Diverter 313 receives the fluid flow therein and divides the fluid flow into a first fluid flow and a second fluid flow by changing the direction of fluid flow substantially perpendicular relative to the flow from inlet 312. Diverter 313 connects to elbows 316 and 318 by friction, threading, welding, glue, or the like, to deliver the first fluid flow to elbow 317 and the second fluid flow to elbow 319. Elbows 317 and 319 reverse its respective fluid flow received from the diverter 313 to deliver the fluid flow to housing 309. Conduits 345 may pass through portions of elbows 317, 319 to allow for pressure measurements and/or for the introduction of fluid or fluids to the streams entering housing 309. As shown, manifold 308 delivers fluid flow into housing 309, those of ordinary skill in the art will recognize many other suitable and equivalent means, such as two pumps and separate connections to housing 309 or a single pump delivering fluid into side portions of housing 309 instead of end portions.

Housing 309 includes inlets 321, 322, outlet 323, and ledges 325 and 326. Housing 309 defines bore 320 along its central axis and bore 324 positioned approximately central to the midpoint of housing 309 and communicating with bore 320. Housing 309 is attached to elbows 317 and 319, using any suitable means, such as flanges and fasteners. Housing 309 receives a first fluid flow at inlet 321 and a second fluid flow at inlet 322. Outlet 323 is connectable to any suitable fluid storage or delivery system using well-known piping means.

Vortex nozzle assembly 310 resides within bore 320 and, in one embodiment, includes vortex nozzles 327 and 328, which are positioned within bore 320 of housing 309 in opposed relationship to impinge the first fluid flow with the second fluid flow, thereby treating the flowing fluid. With vortex nozzle 327 inserted into housing 309, vortex nozzle 327 and housing 309 define cavity 340, which receives the first fluid flow from elbow 317 and delivers the first fluid flow to vortex nozzle 327. Similarly, with vortex nozzle 328 inserted into housing 309, vortex nozzle 328 and housing 309 define cavity 341, which receives the second fluid flow from elbow 319 and delivers the second fluid flow to vortex nozzle 328.

As illustrated in FIGS. 4-8, vortex nozzle 327 includes nozzle body 329 and end cap 330. For the purposes of disclosure, only vortex nozzle 327 will be described herein, however, it should be understood that vortex nozzle 328 may be identical in design, construction, and operation to vortex nozzle 327 and merely positioned within bore 320 of housing 309 in opposed relationship to vortex nozzle 327 to facilitate impingement of the second fluid flow with the first fluid flow.

Nozzle body 329, in one embodiment, is substantially cylindrical in shape and includes tapered passageway 331 located axially therethrough. The tapered passageway 331 includes inlet side 332 and decreases in diameter until terminating at an outlet side 333. The taper of the tapered passageway 331 is at least 1° and at most 89°. In some embodiments, the taper of the tapered passageway is at least 5° and at most 60°.

Nozzle body 329 includes shoulder 334 having raised portion 335 with groove 336 therein. Shoulder 334 is sized to frictionally engage vortex nozzle 327 with an interior surface of housing 309, while raised portion 335 of the vortex nozzle abuts ledge 325, thereby controlling the position of vortex nozzle 327 within the housing 309. Groove 336 receives a seal (e.g. an o-ring) to seal nozzle body 329 with housing 309 and, thus, vortex nozzle 327 within housing 309.

Nozzle body 329 further includes ports 337, 338, and 339 for introducing fluid into tapered passageway 331 of vortex nozzle 327. As shown, ports 337, 338, and 339 may be equally spaced radially about the nozzle body 329 beginning at inlet side 332. Although three ports 337, 338, and 339 are shown, those of ordinary skill in the art will recognize that any number of ports may be utilized. Furthermore, ports 337, 338, and 339 may be any shape suitable to deliver fluid into the tapered passageway 331, such as elliptical, triangular, D-shaped, and the like.

As shown, ports 337, 338, and 339 are tangential to the inner surface of tapered passageway 331 and enter tapered passageway 331 at the same angle as the taper of the tapered passageway, which enhances the delivery of the fluid into tapered passageway 331 and, ultimately, the distribution of the fluid around the tapered passageway. Although tangential ports 337, 338, and 339 are shown as being angled with the taper of the tapered passageway 331, those of ordinary skill in the art will recognize that the ports 337, 338, and 339 may enter tapered passageway 331 at any angle relative to the taper of the tapered passageway 331.

End cap 330 abuts the end of nozzle body 329, defining inlet side 332, to seal inlet side 332, and thereby permitting fluid to enter into the tapered passageway 331 through ports 337, 338, and 339. End cap 330 may include boss 342 formed integrally therewith or attached thereto at approximately the center of the inner face of the end cap. In this embodiment, the boss 342 is conical in shape and extends into tapered passageway 331 to adjust the force vector components of the fluid entering tapered passageway 331. Passageway 343 through boss 342 communicates with cavity 344 at approximately the center of the outer face of end cap 330. Conduit 345 (see FIG. 4) fits within cavity 344 to permit measurement of a vacuum within tapered passageway 331.

A flow of fluid delivered to vortex nozzle 327 enters tapered passageway 331 via ports 337, 338, and 339. The entry of fluid through ports 337, 338, and 339 imparts a rotation to the fluid, thereby creating a rotating fluid flow that travels down tapered passageway 331 and exits outlet side 333. Each port 337, 338, and 339 delivers a portion of the fluid flow to tapered passageway 331. The flow may be in multiple bands that are distributed uniformly in thin rotating films about tapered passageway 331. This minimizes pressure losses due to internal turbulent motion. Accordingly, vortex nozzle 327 provides for a more intense and stable impact of rotating fluid flow exiting outlet side 333 of tapered passageway 331 with fluid exiting vortex nozzle 328.

In some embodiments, a cross-sectional area of ports 337, 338, and 339 is less than the cross-sectional area of inlet side 332 of tapered passageway 331, which creates a reduced pressure within the rotating fluid flow. It should be understood to those of ordinary skill in the art that the size of ports 337, 338, and 339 may be varied based upon particular application requirements. The amount of vacuum created by ports 337, 338, and 339 may be adjusted utilizing boss 342 to alter the force vectors of the rotating fluid flow. Illustratively, increasing the size of boss 342 (e.g., either diameter or length) decreases the volume within the tapered passageway 331 fillable with fluid, thereby increasing the vacuum and, thus, providing the rotating fluid flow with more downward and outward force vector components.

In operation, manifold 308 is assembled as previously described and connected to pump 307. Vortex nozzles 327 and 328 are inserted in opposed relationship into housing 309 as previously described, and housing 309 is connected to manifold 308. Pump 307 pumps fluid from a fluid source and delivers the fluid into manifold 308, which divides the fluid into a first fluid flow and a second fluid flow. Manifold 308 delivers the first fluid flow into cavity 340 of housing 309 and the second fluid flow into cavity 341 of housing 309. The first fluid flow enters vortex nozzle 327 from cavity 340 via the ports of vortex nozzle 327. Vortex nozzle 327 receives the fluid therein and imparts rotation to the fluid, thereby creating a first rotating fluid flow that travels down vortex nozzle 327 and exits its outlet side. Similarly, the second fluid flow enters vortex nozzle 328 from cavity 341 via the ports of vortex nozzle 328. Vortex nozzle 328 receives the fluid therein and imparts rotation to the fluid, thereby creating a second rotating fluid flow that travels down vortex nozzle 328 and exits its outlet side. Due to the opposed relationship of vortex nozzles 327 and 328, the first rotating fluid flow impinges the second rotating fluid flow, resulting in the treatment of the fluid through the breaking of molecular bonding in the fluid and/or the reduction in size of solid particulates within the fluid. The treated fluid then exits outlet 323 of housing 309 and travels to a suitable fluid storage or delivery system.

Pressure equalizing manifolds and/or stabilization chambers may be coupled to the fluid inlet of a fluid treatment system. In some embodiments, a pump may be coupled to the inlet to increase the velocity and/or pressure at which a stream enters a vortex nozzle unit. In other embodiments, a pump is not coupled to the system. The inlet may be coupled to each vortex nozzle unit. If a vortex nozzle unit includes two or more vortex nozzles, the inlet may be coupled to each of the individual vortex nozzles. In such a situation, a portion of the stream may concurrently flow into each vortex nozzle.

In some embodiments, a flow divider may be coupled to the inlet. The flow divider may direct the flow of fluid into more than one vortex nozzle unit. The flow divider may change the direction of fluid flow. In certain embodiments, the flow divider may have a shape similar to a "Y". A "Y" shaped flow divider may be advantageous, since the shape may allow a smoother transition of fluid flow than if a flow divider abruptly stopped and redirected fluid flow, such as with a "T" shaped flow divider. A "Y" shaped flow divider may also reduce the discharge head pressure loss caused by redirection, and thus have higher velocities of the resulting divided fluid streams, when compared with abruptly stopping and redirecting fluid flow.

In some embodiments, a vortex nozzle unit may include more than one inlet that allows fluid to enter the vortex nozzle unit. An inlet may be a variety of shapes, including having a substantially rectangular, a substantially trapezoidal, a substantially elliptical, a substantially triangular, or a substantially D-shaped cross sectional area. Inlets into the vortex nozzle unit may be approximately equally spaced radially about a nozzle. In certain embodiments, inlets into the vortex nozzle unit may be positioned such that fluid enters the vortex nozzle unit at a variety of points across the vortex nozzle unit.

When a vortex nozzle unit includes a plurality of vortex nozzles such nozzles may be similar or different in size and/or shape. A vortex nozzle may compress fluid flowing through the nozzle and/or increase the velocity of fluid flowing through the nozzle. A vortex nozzle may have a shape that directs streams exiting the vortex nozzle to flow clockwise or counterclockwise. In an embodiment, the streams flowing from a first vortex nozzle unit is rotating in a clockwise direction while the stream flowing from an opposed second vortex nozzle unit is rotating in a counterclockwise direction.

In some embodiments, the pressure of the stream in a vortex nozzle unit may be in the range of approximately 50 pounds per square inch (psi) to approximately 200 psi, approximately 80 psi to approximately 140 psi, or approximately 85 psi to approximately 120 psi. The stream may flow into a fluid treatment system at a flow rate of 1500 gallons per minute or less. In certain embodiments, a stream may flow into a fluid treatment unit at a flow rate of approximately 70 to approximately 200 gallons per minute.

In some embodiments, hydrodynamic cavitation may occur as the stream passes through a vortex nozzle unit and/or when exit streams from the vortex nozzle units contact each other. In some embodiments, a plurality of vapor filled cavities and bubbles form if the pressure decreases to a level where the fluid boils. Boiling of the fluid may, in some embodiments, reduce the water content in the sludge and/or reduce an amount of volatile organic compounds in the stream.

Fluid and cavitation bubbles may initially encounter a region of higher pressure when entering one or more of the vortex nozzle units in the system and encounter a vacuum area, at which point vapor condensation occurs within the bubbles and the bubbles collapse. The collapse of cavitation bubbles may cause hydrodynamic cavitations and pressure impulses. In some embodiments, the pressure impulses within the collapsing cavities and bubbles may be on the order of up to 1000 lbs/in$^2$. Hydrodynamic cavitation and/or other forces exerted on the fluid (e.g., pressure impulse, side walls of the nozzles) may cause changes in solubility of dissolved gasses, pH changes, formation of free radicals, and/or precipitation of dissolved ions such as phosphates, nitrates, calcium, iron, and carbonate. In addition, shear forces created during hydrodynamic cavitation may destroy some biological contaminants, aerate a stream, decrease particulate size, remove water from sludge, and/or remove volatile materials from the stream being processed.

In some embodiments, hydrodynamic cavitation and/or the physical and mechanical forces created as the stream flows through the vortex nozzle units (e.g., shear collision and pressure/vacuum forces) may kill, lyse, or at least partially injure biological contaminants, remove water, remove volatile organic compounds, change particulate size, or combinations thereof. When an organism is at least partially injured, the organism may be unable to maintain viability, growth, reproduction, metabolic activities, and/or adversely affect its environment. When an organism is lysed, its cellular constituents and water may be released. Biological contaminants in a stream may be killed and/or partially injured by high shear, collision, rapid pressure/vacuum changes, hydrodynamic cavitation forces, and/or other hydrodynamic changes in the fluid as it passes through the fluid treatment system. In some embodiments, biological contaminants may not be able to survive in the hydrodynamic cavitation region formed in the vortex nozzle unit and/or proximate an outlet of the vortex nozzle unit. Hydrodynamic and/or shear forces may lyse cells such as bacteria to produce nutrients for microbial growth. For example, lysing cells may release the cell contents such as water, protein, nuclei acids, cytoplasm and light organic substances.

Processing streams with any of the above-described fluid treatment systems will eradicate and/or lyse at least a portion of the biological contaminants (e.g., pathogens, bacteria and/or microorganism) in streams produced by a primary treatment system and/or a secondary treatment system. In some embodiments, processing streams with any of the above-described fluid treatment systems may aerate the stream, reduce particle size of particulates, and/or reduce the BOD of the treated stream. In certain embodiments, processing of the waste streams with any of the above-described fluid treatment systems may remove enough contaminants such that the use of chlorine and/or other disinfections may be lessened or they may not necessary. In certain embodiments, processing chlorinated streams with any of the above-described fluid treatment systems will remove at least a portion of the chlorine and/or volatile organic compounds in the chlorinated stream. In some embodiments, processing of sludge may remove entrained water from the stream, lyse cells, aid in defloculation of solids, and/or kill or at least partially destroy pathogens and/or some bacteria, in the stream to reduce sludge volume, reduce the amount of wet cake and/or increase the solids content of the sludge volume or sludge volume of the wet cake. The processed sludge and/or wet cake may be acceptable for use as biosolids. In some embodiments, the sludge may then be further processed and/or dried to produce biosolids.

The amount of biodegradable organic material in the raw wastewater may be expressed as BOD. The BOD and other constituents in the raw wastewater may be converted by biological respiration and synthesis in aeration systems to carbon dioxide, water and new cells. Most of the BOD (40 to 60%) is due to formation of new cells as a result of aerobic respiration. The new cells are produced on a daily basis and are removed for continued proper operation of wastewater treatment facilities.

In some embodiments, an additive may be added to one or more of the sets of nozzles to increase the amount of biological contaminants eradicated, reduced, and/or lysed. In certain embodiments, additives may be added to aid in the removal of chlorine and/or aid in the nitrification of the stream. In some embodiments, an additive may be added to change the size of particulates that make up the biosolids so that the biosolids are easier to handle. In an embodiment, at least a portion of the contacted sludge stream may be sent to an anaerobic digestion reservoir via one or more return lines.

In some embodiments, a fluid treatment system may include an inlet. The inlet may be coupled to a conduit and/or reservoir (e.g., a waste stream reservoir and/or a sludge reservoir) of a wastewater treatment system. The concentration of solids and/or biological contaminants in the reservoir and/or in lines coupling the fluid treatment system to one or more units of the wastewater treatment system may be monitored. In some embodiments, a stream may be continuously processed by the fluid treatment system. For example, the stream may be continuously drawn from a reservoir, into the fluid treatment system and returned to the reservoir, to control the concentration of biological contaminants, degree of aeration, reduction of water, reduction of volatile organic compounds, reduction in particulate size, or combinations thereof. Additionally, the concentration of biological contaminants, particulate size, oxygen concentration, water concentration, volatile compounds concentration in the fluid exiting the fluid treatment system may be monitored. If the fluid exiting the fluid treatment system is not within a predetermined acceptable range, the fluid may be recycled back into the fluid treatment system, an additive may be introduced into the fluid treatment system, and/or the amount of additive introduced to the fluid treatment system may be modified.

Figure 9A:
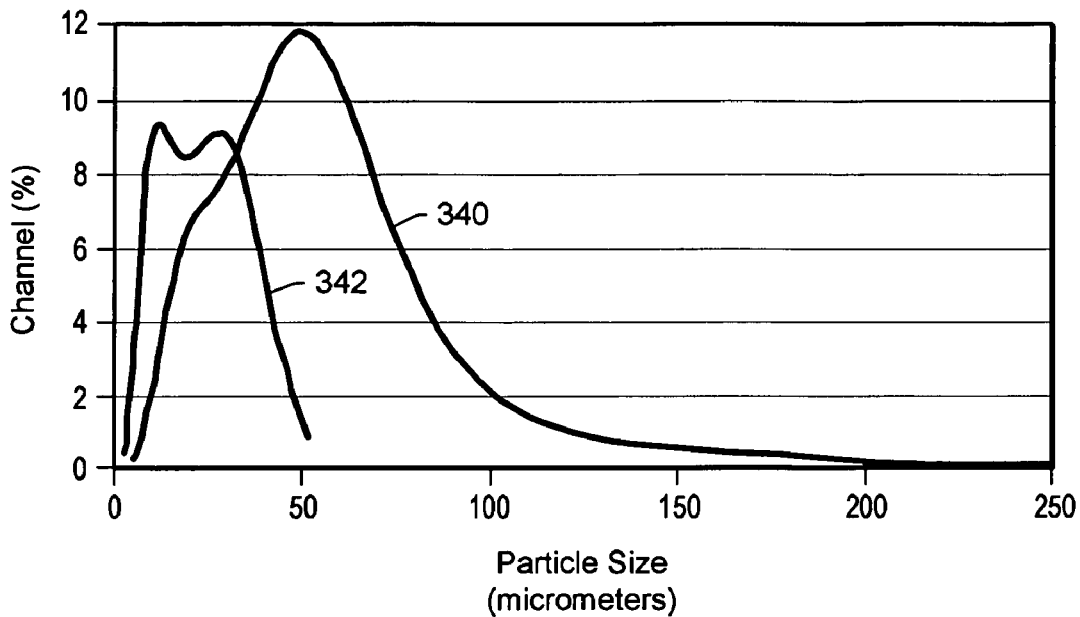
FIGS. 9A and 9B depict graphs denoting the change in particle size distribution during multiple passes through a fluid treatment system.
Figure 9B:
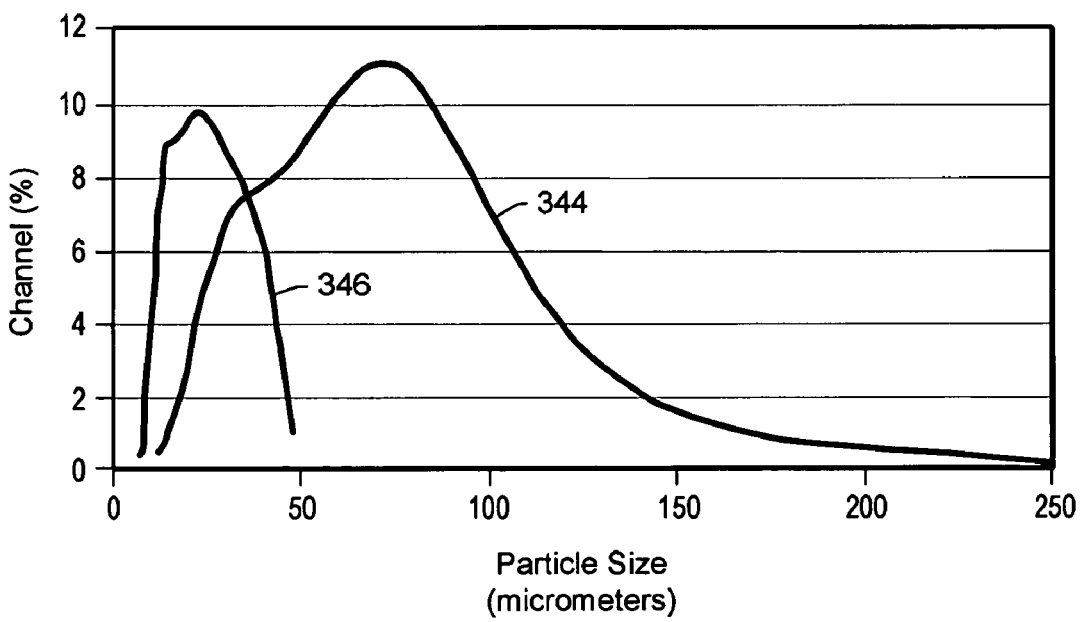

In some embodiments, processing of the wastewater streams in the fluid treatment system may also declump microorganisms, reduce particulate particle size, disrupt/rupture filamentous cellular bulking, and disrupt hydrated, inert particulates and/or hydrated agglomerated particulates. In some embodiments, a size distribution of particulates in sludge may be reduced by about 90%, by about 80%, by about 70%, by about 60%, by about 50%, by about 30%, or about 10% when processed in the fluid treatment system as compared to the size distribution of particles in sludge from a conventional wastewater treatment facility. After treatment in a fluid treatment system, the size distribution of particles in the sludge may range from about 0.001 microns to about 100 micrometers, from about 1 micrometers to about 70 micrometers, from about 5 micrometers to about 40 micrometers, or from about 10 micrometers to 30 micrometers. As shown in FIGS. 9A and 9B, treatment of a sludge sample in the fluid treatment system after numerous passes reduced particulate particle size by about 50%. In FIGS. 9A and 9B, lines 340 and 344 represent particle size distributions after processing a sludge stream through fluid treatment system 100. Lines 342 and 346 represent particle size distributions after processing a sludge stream through fluid treatment system 100. As shown in FIGS. 9A and 9B, the particle size distribution of the particles initially ranged from about 1 micrometer to about 250 micrometers with an average particle size of 75 micrometers and was altered to about 1 micrometer to 50 micrometers with an average particle size of about 10 micrometers after treatment.

Additionally, when streams of fluids containing water collide with a speed of at least 450 mph collide (e.g., between 450 mph to 600 mph), at least some of the oxygen-hydrogen bonds in the water may be broken. The fragments from the collision may reform to produce hydrogen peroxide and other highly reactive intermediates. Hydrogen peroxide and/or the other highly reactive intermediates formed by hydrodynamic cavitation and the high-speed collision of water may destroy at least a portion of the biological contaminants in the fluid. The reactive intermediates may react with inorganic and organic impurities (e.g. chlorinated compounds, nitrates, ammonia, and/or phosphorous compounds) to form compounds that do not contaminant water bodies and/or enhance algae growth. For example, formation of hydrogen peroxide may dechlorinate chlorinated compounds in situ.

In some embodiments, one or more additives may be introduced into one or more of the vortex nozzle units via one or more additive inlets. Additives may include biocides and nonbiocides. Biocides may include aldehydes, formaldehyde releasing compounds, halogenated hydrocarbons, phenolics, amides, halogenated amines and amides, carbamates, heterocyclic compounds including nitrogen and sulfur atoms at least in the ring portion of the structure, electrophilic active substances having a halogen group in the α position and/or in the vinyl position to an electronegative group, nucleophilic active substances having an alkyl group and at least one leaving group, surface active agents, and/or combinations thereof. Biocides may include, but are not limited to, linear, branched, or aromatic aldehydes such as glutaraldehyde; halogenated, methylated nitro-hydrocarbons such as 2-bromo-2-nitro-propane-1,3,-diol; halogenated amides such as 2,2-dibromo-3-nitrilopropionamide (DBNPA); thiazole; isothiazolinone derivatives such as 5-chloro-2-methyl-4 isothiazolin-3-one and 2-methyl-4-isothiazonlin-3-one; 1,2-dibromo-2,4-dicyanobutane, bis(trichloromethyl)sulfone, 4,5-dichloro-1,2-dithiol-3-one, 2-bromo-2-nitrostyrene; 2-n-octyl-4-isothiazolin-3-one; 4,5-dichloro-2-(n-octyl)-4-isothiazolin-3-one; 1,2-benzisothiazolin; o-phthaldehyde; 2-bromo-4'-hydroxyacetophenone; methylene bisthiocyanate (MBTC); 2-(thiocyanomethylthio)benzothiazole; 3-iodopropynyl-N-butylcarbamate; n-alkyl dimethyl benzyl ammonium chloride; didecyl dimethyl ammonium chloride; alkenyl dimethylethyl ammonium chloride; 4,5-dichloro-1,2-dithiol-3-one; decylthioethylamine; n-dodecylguanidine hydrochloride; n-dodecylguanidine acetate; 1-(3-chloroallyl)-3,5,7-triaza-1-azoniaadamantane chloride; bis(1,4-bromoacetoxy)-2-butene; bis(1,2-bromoacetoxy)ethane; diiodomethyl-p-tolylsulfone; sodium o-phenylphenate; tetrahydro-3,5-dimethyl-2H-1,3,5-hydrazine-2-thione; cationic salts of dithiocarbamate derivatives; 4-chloro-3-methyl phenol; 2,4,4'-trichloro-2'-hydroxy-diphenylether; poly(iminoimidocarbonyl-iminioimidocarbonyl-iminohexamethylene) hydrochloride; poly(osyethylene(dimethyliminio)ethylene-(dimethyliminio)ethylene dichloride; 4-chloro-2-(t-butylamino)-6-(ethylamino)-s-triazine; and/or combinations thereof.

In some embodiments, it may not be desirable to use biocides in a stream due to the health problems exposure to the biocides may cause. In some embodiments, nonbiocides may be introduced into one or more of the sets of nozzles. Non-biocides may include surfactants, emulsifiers, and certain polymeric compounds. Non-biocidal additives may not kill microorganisms but may increase the speed and/or quantity of bacteria killed in the system. Although non-biocidal additives may not kill bacteria alone, the use of such materials in a fluid treatment system may increase the quantity of bacteria killed when compared to using the fluid treatment system in the absence of a non-biocidal additive. In certain embodiments, an additive may include a cationic polymeric product known as PERFORM® 1290 (Hercules Incorporated, Wilmington, Del., USA). (See TABLE 1)

TABLE 1

| Treatment | Concentration of Additive | Treatment Time | Percent Change in Bacteria Population |
|---|---|---|---|
| Perform ® 1290 (1.5 ppm) | 0.5 ppm for 10 min; 0.5 ppm for 10 min; 0.5 ppm for 10 min. | 30 min | +5.00 |
| Perform ® 1290 (1.5 ppm) + fluid treatment system | 0.5 ppm for 10 min; 0.5 ppm for 10 min; 0.5 ppm for 10 min. | 30 min | −99.47 |

In certain embodiments, DTEA (2-decylthioethylamine), and/or DTEA II (1-(decylthio)ethylamine), may be used as an additive. DTEA and/or DTEA II may disrupt coenzyme materials in cells necessary for photosynthesis and thus injure the cells. The concentration and/or formulation of DTEA and/or DTEA II used in trace amounts without a fluid treatment system may not be sufficient to act as an effective biocide. DTEA and/or DTEA II, however, may increase the bacteria killing effectiveness of the system when used with the fluid treatment system (See TABLE 2).

TABLE 2

| Treatment | Concentration of Additive | Treatment Time | Percent Change in Bacteria Population |
|---|---|---|---|
| DTEA II (3.00 ppm) | 1.0 ppm for 10 min. 1.0 ppm for 10 min. 1.0 ppm for 10 min. | 30 min. | +6.77 |
| DTEA II (3.0 ppm) + fluid treatment system | 1.0 ppm for 10 min. 1.0 ppm for 10 min. 1.0 ppm for 10 min. | 30 min. | −98.62 |

In some embodiments, VANTOCIL® 1B (poly iminoimidocarbonyl-iminoimidocarbonyl-iminohexamethylene hydrochloride, (ARCH Chemicals, Newark, Del.) may be used with the fluid treatment system as an additive in trace amounts. (See TABLE 3)

TABLE 3

| Treatment | Concentration of Additive | Treatment Time | Percent Change in Bacteria Population |
|---|---|---|---|
| Vantocil ® 1B | 0.1 ppm for 10 min; 0.2 ppm for 10 min | 20 min | −66.28 |
| Vantocil ® 1B + the fluid treatment system | 0.1 ppm for 10 min; 0.2 ppm for 10 min | 20 min | −97.57 |

An amount of additive may be introduced into the fluid treatment system to reduce a microbiological content of the stream to a desired level or range. In some embodiments, approximately 0.1 to 6 ppm of additive may be introduced into the inlet of the fluid treatment system stream. The use of an additive may increase the system's effectiveness in eradicating biological contaminants. An additive may be able to increase a fluid treatment system's effectiveness in eradicating, lysing, reducing or controlling biological contaminants by a greater amount than the effectiveness of the additive alone, the fluid system alone or a combination of the additive alone and the fluid system alone.

In fluid treatment systems described herein, a "pass" through the fluid treatment system is defined as passing a fluid through the system for a time sufficient to pass the entire volume of a reservoir through the system. For example, if the reservoir to be treated by the fluid treatment system is a 20-gallon reservoir, a "pass" is complete when 20 gallons of fluid from the reservoir have gone through the fluid treatment system.

In some embodiments, all or a portion of the stream flowing out of the fluid treatment system may be recycled through the fluid treatment system via one or more recycle lines. Recycling the stream through the fluid treatment system for a number of passes may allow for significant reduction of the concentration of bacteria and other microorganisms in the stream. In some embodiments, a portion of the stream exiting the fluid treatment system may be mixed with a portion of the stream entering the fluid treatment system the inlet.

Figure 10:
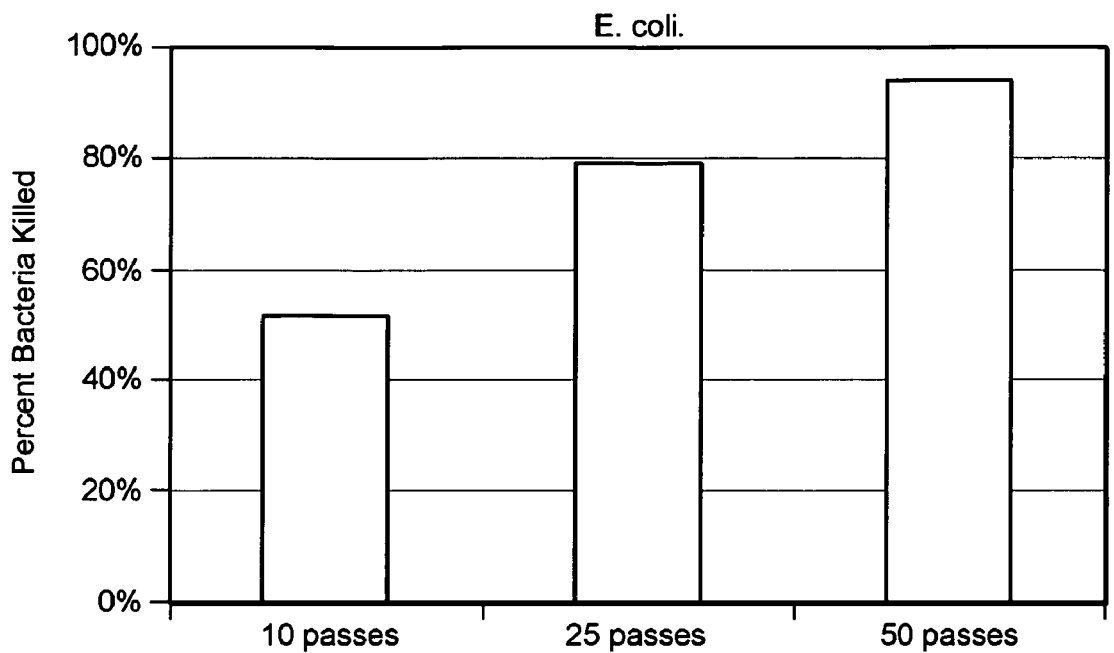
FIG. 10 depicts a graph denoting the change in biological contaminants (i.e., *E. coli*) during multiple passes through a fluid treatment system.
Figure 11:
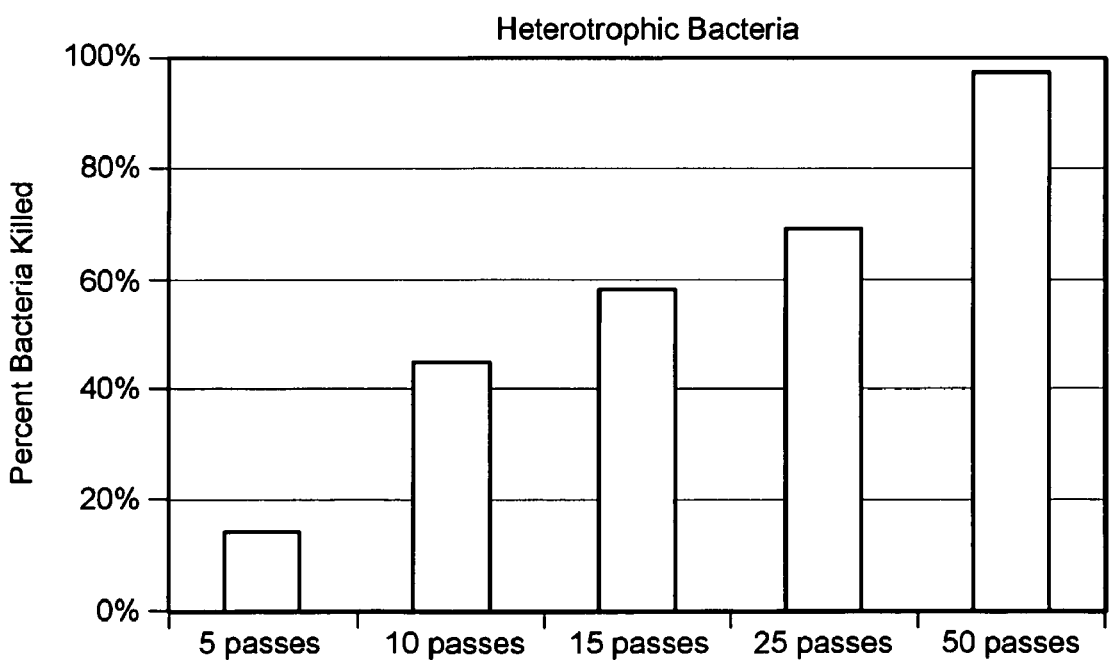
FIG. 11 depicts a graph denoting the change in biological contaminants (i.e., heterophic bacteria) during multiple passes through a fluid treatment system.

FIG. 10 depicts examples of the percent of bacteria killed when *Escherichia coli* is subjected to multiple passes through the fluid treatment system. In this experiment, a fluid that includes *E. coli* bacteria was subjected to 10, 25, and 50 passes through a fluid treatment system commercially available from VRTX™, San Antonio, Tex. The bacteria population was determined before and after the fluid was treated with the fluid treatment system using Method 9215B from the "Standard Methods for the Examination of Water and Wastewater." As depicted in FIG. 10, the percentage of bacteria killed increased as the number of passes through the fluid treatment system increased. A similar test was performed on a fluid that included a mixed community of heterotrophic bacterial species (See FIG. 11).

In some embodiments, the system may be monitored and/or adjustments made as needed to control the concentration of biological contaminants in the streams. For example, the bacterial concentration may be monitored continuously or periodically by employing an appropriate bacterial quantization method (e.g., using a dipstick). Monitoring the concentration of biological contaminants continuously or periodically may allow for the adjustment of flow rates, number of recycles through the system, and/or the amount and/or type of additive introduced into the system so that the concentration of biological contaminants in the stream exiting the fluid treatment system is at or below a desired level.

During processing of a sludge stream, additives may be added to the fluid treatment system to enhance dewatering, increase the sludge and/or wet cake solids content, assist in forming biosolids, or combinations thereof. The additives for enhancement of dewatering include, but are not limited to, polymers and/or surfactants. Examples of dewatering aids include, but are not limited to, quaternary ammonium compounds, acrylamide; dimethyl benzyl ammonium compounds, methacrylamide; N,N-dialkylacrylamides; N-alkyl acrylamide; N-vinyl methylacetamide; N-vinylmethyl formamide; vinyl acetate; N-vinyl pyrrolidone; N,N-dialkylaminoalkyl acrylates and methacrylates and their quaternary or acid salts; N,N-dialkyl aminoalkylacrylamides and methacrylamides and their quaternary or acid salts; or diallyl dimethylammonium salts. U.S. Pat. Nos. 5,954,964 to Nielson et al.; 5,643,461 to Neff et al.; 5,232,584 to Wang et al. describe dewatering aids.

Figure 12:
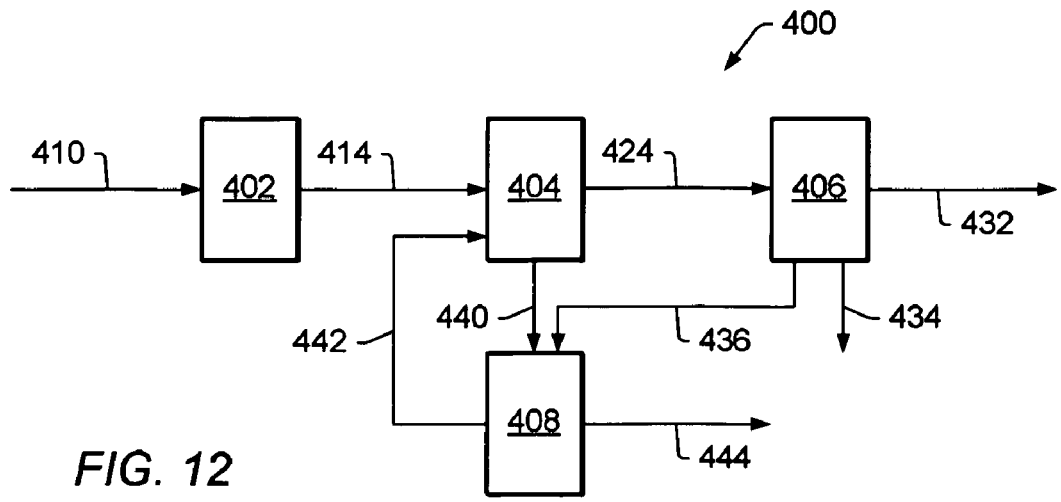
FIG. 12 depicts a schematic of an embodiment of a wastewater treatment facility.

Wastewater treatment system that include one or more fluid treatments systems are depicted in FIGS. 12-15 and 18-22. It should be understood that where one fluid treatment system is shown, more than one fluid treatment systems having different flow capacities may be used. As shown in FIG. 12, wastewater treatment system 400 includes primary treatment system 402, secondary treatment system 404, disinfection system 406 and solids treatment system 408. Raw wastewater may enter primary treatment system 402 via raw wastewater conduit 410. In some embodiments, the raw wastewater passes through one or more large screens or grids prior to entering primary treatment system 402. The screens and/or grids remove large floating objects such as rags, cans, bottles, sticks, limbs, grit, and/or sand that may clog pumps, pipes, and/or processes positioned downstream of the screens and/or grids. In certain embodiments, the screens and/or grid may be positioned at an incline. In some embodiments, shredding devices may be used alone or in combination with the screens and/or grids. The shredding devices may reduce the size of the large floating objects. The smaller objects may be left in the wastewater as it passes to primary treatment system 402.

In primary treatment system 402, suspended solids are removed from the water using techniques known in the art such as sedimentation, gravity settling, chemical coagulation, or filtration. Primary treatment system 402 may include, but is not limited to, a settling tank (primary clarifier), filter, and/or equipment known in the art to remove suspended solids from water. As wastewater enters settling tank 412 (shown in FIG. 13), the wastewater slows down and the suspended solids sink to the bottom of the tank. Mechanical equipment may remove the settled solids from settling tank 412. The solids may be removed on a continuous or intermittent basis.

Separated wastewater from settling tank 412 may enter secondary treatment system 404 via conduit 414. In secondary treatment system 404, organic material in the wastewater is removed using biological treatment processes such as attached growth processes, suspended growth processes, and/or activated sludge processes. Secondary treatment system 404 may include aeration unit 416 and/or a settling unit 418.

In embodiments using attached growth or fixed film processes, microbial growth occurs on the surface of stone or plastic media. Wastewater passes over the media in aeration unit 416 along with air to provide oxygen to the bacteria. Attached growth processes may include, but are not limited to, trickling filters, biotowers, rotating biological contactors or combinations thereof. Attached growth processes may remove biodegradable organic material from the wastewater. Bacteria, algae, fungi and other microorganisms grow and multiply forming a biologically active mass (biomass) on the media. In the treatment process, the bacteria use oxygen from the air and consume most of the organic matter in the wastewater as food. As the wastewater passes down through the media, oxygen-demanding substances are consumed by the biomass and the water leaving aeration unit 416. Portions of the biomass slough off the media and are removed from the wastewater in settling unit 418 (secondary clarifier).

In embodiments using suspended growth processes biodegradable organic material are removed and organic nitrogen-containing material are converted to nitrates. In suspended growth processes, a suspension of water and microbial growth media placed in aeration unit 416. In aeration unit 416, wastewater is mixed with air and the microbial growth media for a period of time. Excess sludge generated in the process may be removed in settling unit 418.

In embodiments using activated sludge processes, oxygen is supplied by mixing air with wastewater and biologically active solids in aeration unit 416. In some embodiments, mechanical aeration of the wastewater/solid mixture may be accomplished by drawing the sewage up from the bottom of the tank and spraying over the surface, thus allowing the bacteria in the wastewater to absorb large amounts of oxygen from the atmosphere. In certain embodiments, pressurized air may be forced out through small opening in pipes suspended in the wastewater. In other embodiments, a combination of mechanical and forced aeration is used to treat the wastewater. Sludge generated in an activated sludge process is removed from the water in settling unit 418. In some embodiments, the sludge is recycled to the aeration unit.

Figure 13:
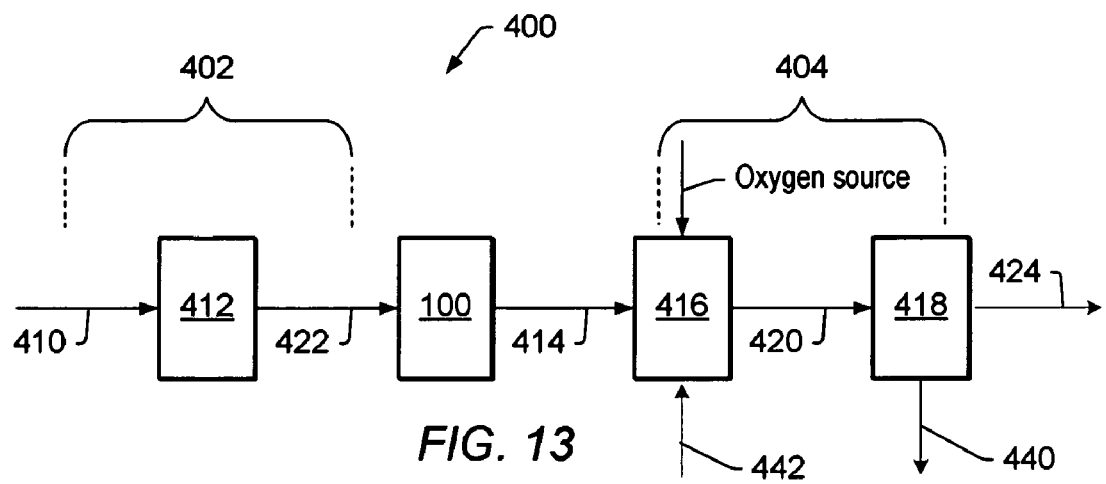
FIG. 13 depicts a schematic of an embodiment of a wastewater treatment facility that includes a fluid treatment system coupled to a primary treatment system and a secondary treatment system.

A slurry of water and sludge generated from the above aeration processes exits aeration unit 416 enters settling unit 418 via conduit 420 (see FIG. 13). In settling unit 418, at least a portion of the sludge is separated from the water using gravitation and/or mechanical means.

A wastewater treatment system may include one or more fluid treatment systems. FIG. 13 depicts a schematic of primary treatment system 402, fluid treatment system 100 and secondary treatment system 404 of wastewater treatment system 400. Fluid treatment system 100 is positioned between primary treatment system 402 and secondary treatment system 404. In some embodiments, fluid treatment system 100 is a unit of primary treatment system 402. It should be understood that fluid treatment system 100 may be coupled to other units in primary treatment system 402. As shown, wastewater exits settling tank 412 and enters fluid treatment system 100 via conduit 422. In some embodiments, an inlet of fluid treatment system 100 is coupled to an outlet of settling tank 412. The wastewater stream includes pathogens and/or particulate matter. Wastewater entering fluid treatment system 100 is processed using the methods described herein for processing streams and/or fluids.

Processing the wastewater in fluid treatment system 100 may aerate the wastewater, reduce BOD, reduce a size of particulate matter in the wastewater, or combinations thereof. Increasing the amount of oxygen present in the wastewater stream may lessen the requirement for external oxygen to be added to aeration tank 416 during the secondary treatment process. Processing the wastewater in the fluid treatment system may kill and/or destroy at least a portion of the pathogens in the wastewater thus reducing the amount of oxygen required by the microbes in the aeration unit. A reduction in the required amount of oxygen may result in a lower BOD for the system. Fluid treatment system 100 may reduce the average particle size in the stream. Smaller particle sizes may have less water retention and/or water absorption, resulting in smaller water reduction demand in downstream solids processing. Reduction in water and/or particle size may decrease an amount and/or size of biosolids produced relative to the amount and/or size of biosolids produced using techniques known in the art. Smaller particle size with less water retention may enhance the number of sites in the sludge available for microbial action.

Treated wastewater exits fluid treatment system 100 through conduit 414. Treated wastewater may include, but is not limited to, water, at least a portion of the pathogens, and/or sludge. At least a portion of the particles in the stream may have a smaller size than the particles entering fluid treatment system 100. In some embodiments, an outlet of fluid treatment system 100 is coupled to an inlet of aeration unit 416. The treated wastewater may be processed in secondary treatment system 404, using methods previously described to produce a water stream and sludge. Sludge generated in secondary treatment system may be processed in solids treatment system 408 using methods described herein and/or known techniques in the art to produce to produce biosolids.

Figure 14:
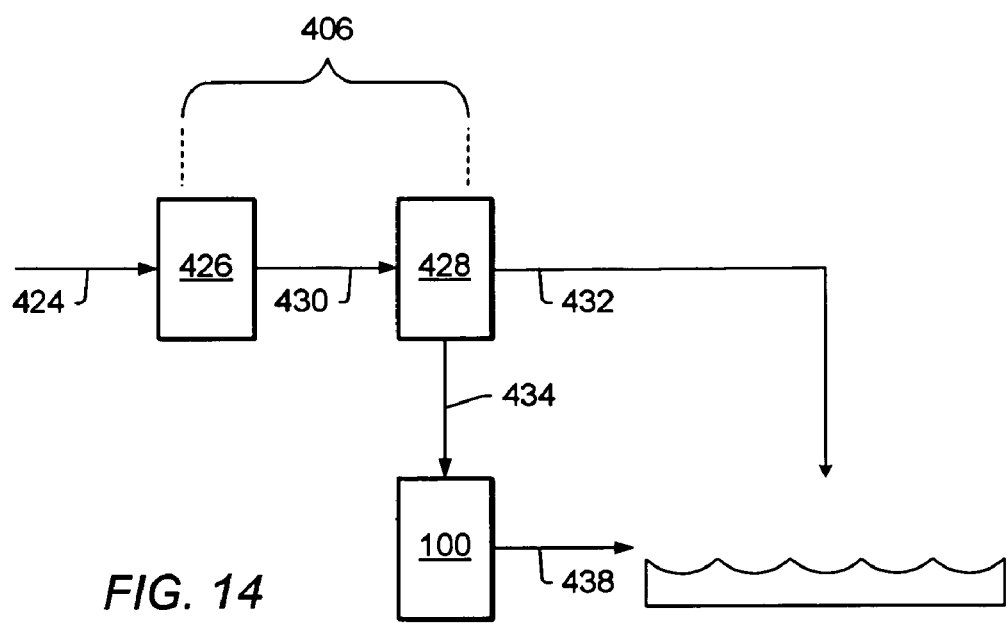
FIG. 14 depicts a schematic of an embodiment of a wastewater treatment facility that includes a fluid treatment system coupled to a disinfection treatment system.

In some embodiments, the water stream may be processed in disinfection treatment system 406 using methods described herein and/or known techniques in the art to produce potable water and effluent. As shown in FIG. 12 and FIG. 14, the water stream in conduit 424 may exit secondary treatment system 404 and enter disinfection treatment system 406. FIG. 14 depicts a disinfection that includes a fluid treatment system 100. Disinfection treatment system may include disinfection unit 426 and clarifier 428. In disinfection treatment system 406, the water may be treated to destroy and/or kill at least a portion of the biological contaminants in the water. Treatment to remove biological contaminants in disinfection unit 426 may include, but is not limited to, chlorination of the water, ozonation of the water, ultraviolet radiation of the water, or combinations thereof. The treated water may enter clarifier 428 via conduit 430. In clarifier 428, water is purified by removing any nitrogen compounds and/or phosphorus compounds, and/or by stabilizing any oxygen demanding microorganisms in the water. Such purification may be done using any physical/chemical separation techniques known in the art. Examples of purification techniques include, but are not limited to adsorption, flocculation/precipitation, filtration, ion exchange, reverse osmosis or combinations thereof. Processing of the water in disinfection treatment system produces potable water and an effluent. The potable water may exit disinfection treatment system 406 via conduit 432. The effluent may exit disinfection unit 406 via conduit 434 and, ultimately, may also be discharged into one or more receiving water bodies. In some embodiments, the effluent may be treated to remove impurities that degrade the quality of receiving water bodies and/or inhibit aquatic life. These impurities include, but are not limited to, chlorine, biological nutrients (e.g., nitrogen and phosphorus compounds), trace amounts of organic and/or inorganic compounds (e.g., volatile organic compounds), or combinations thereof. In some areas of the world, governments have set standards for impurity levels in the effluent.

The effluent may be dechlorinated by treating the effluent with one or more additives suitable to oxidize the chlorine. Examples of dechlorination additives include, but are not limited to, sulfur dioxide, metabisulfite, sodium bisulfite, a peroxide compound (e.g., hydrogen peroxide), or mixtures thereof.

The presence of nitrogen in the form of ammonia in the effluent may be toxic to aquatic life, stimulate algae growth, and/or exert a direct demand on oxygen required for biological processes. Nitrogen may be removed from the effluent by contacting the effluent with nitrifying bacteria that may convert the ammonia to nitrate. Additional bacteria may be added to the effluent to convert nitrate into nitrogen, which may be released into the atmosphere.

In some embodiments, phosphorus is removed from the effluent to inhibit algae growth in receiving water bodies that receive the effluent. Phosphorus may be removed through chemical addition and/or a coagulation-sedimentation process. In some embodiments, bacteria selective for phosphorus removal may be used. Chemical addition and/or coagulation-sediment process to remove phosphorus may involve addition of additives that upon contact with the phosphorus floc or clump together. These flocs and/or clumps may be removed using filtration techniques known in the art and/or sent to solid treatment system 408 via conduit 436 (see FIG. 12).

One or more treatments and/or units may be necessary to remove impurities from the waste stream to produce an effluent that is suitable for discharge into receiving water bodies. Use of the fluid treatment system as part of a disinfection treatment system and/or after the waste stream has exited a clarifier may reduce the number of treatments and/or units required to produce an effluent suitable to be discharged to one or more receiving bodies.

As depicted in FIG. 14, waste stream from clarifier 428 may enter fluid treatment system 100 via conduit 434. In some embodiments, disinfection treatment system 406 includes more than one fluid treatment system. The fluid treatment system may be coupled to any of the units in the disinfection treatment system.

In fluid treatment system 100, the waste stream may be processed as previously described herein to remove chlorine, undergone nitrification, to remove trace amounts and/or volatile organic compounds, or combinations thereof produce an effluent suitable for discharge into receiving water bodies. Through high shear, collision, rapid pressure/vacuum changes, hydrodynamic cavitation forces, and/or other hydrodynamic changes in the waste stream as it passes through fluid treatment system 100, the fluid treatment system may remove at least a portion or substantially all of the impurities that can cause harm to receiving water bodies and/or encourage algae growth. Removal of impurities may produce an effluent that can be discharged directly into one or more receiving water bodies. In some embodiments, hydrogen peroxide is generated in situ in the fluid treatment system. The generated hydrogen peroxide may dechlorinate chlorinated compounds in the waste stream. In some embodiments, one or more fluid treatment systems are coupled to one or more units of a disinfection treatment system to reduce or eliminate the need for chlorination. As shown in FIG. 14, effluent exits fluid treatment system 100 via conduit 438 and is discharged into a body of water. In some embodiments, the effluent produced from fluid treatment system 100 meets governmental standards for effluent produced from wastewater treatment facilities. Solids produced in disinfection treatment system 406 may be transported to a solid treatment system and processed using methods described herein or methods known in the art.

In some embodiments, one or more additives suitable for dechlorination of the waste stream, nitrification of the waste stream, and/or phosphorus removal from the waste stream are added through an additive conduit. Addition of the additive to the waste stream may occur as the waste stream passes through the first and/or second vortex nozzle units. Additives include, but are not limited to, sulfur dioxide, metabisulfite, sodium bisulfite, a peroxide compound (e.g., hydrogen peroxide), carbon adsorbent, or mixtures thereof.

Treatment of the waste stream in fluid treatment system 100 may reduce amounts of volatile organic compounds (VOCs), phosphates, and metal ions in the waste stream as compared to treatment in conventional wastewater treatment facilities (see Tables 4-6). VOCs include compounds that have a high vapor pressure and low water solubility. Examples of VOCs include, but are not limited to, methyl t-butyl ether (MTBE) and/or trichloroethane (TCE). Metal ions, include, but are not limited to, metals from Columns 1-13 of the Periodic Table. For example, treatment of a waste stream in fluid treatment system may reduce levels of iron, calcium, aluminum, manganese, and zinc ions in the waste stream (see Table 5 and Table 6).

TABLE 4

| VOC | Before Treatment in the Fluid Treatment System | After Treatment in the Fluid Treatment System |
|---|---|---|
| MTBE, parts per billion (ppb) | 40.1 | 3.24 |
| TCE, ppb | 12 | <2 |

TABLE 5

| Metal Ions | Before Treatment in the Fluid Treatment System | After Treatment in the Fluid Treatment System |
|---|---|---|
| Calcium, parts per million | 95.2 | 3.24 |
| Phosphate, parts per million | 88 | <2 |

TABLE 6

| Metal Ions | Before Treatment in the Fluid Treatment System | After Treatment in the Fluid Treatment System |
|---|---|---|
| Iron, parts per million (ppm) | 11.8 | 0.25 |
| Calcium, ppm | 74 | 15 |
| Aluminum, ppm | 6.58 | 0.18 |
| Manganese, ppm | 4.7 | 0.24 |
| Zinc, ppm | 0.23 | 0.02 |

Referring to FIG. 12, sludge from secondary treatment system 404 and disinfection treatment system 406 enters solid treatment system 408 via conduits 440 and 436 respectively. In solid treatment system 408, sludge may be treated to control odors, reduce the number of pathogens, remove water, remove volatile compounds, or combinations thereof. Biosolids produced in solid treatment system 408 exit the solid treatment system via conduit 444. The biosolids may be sent to a biosolid transport site where the biosolids are transported to disposal facilities or other processing facilities. For example, biosolids may be disposed by spreading on land as fertilizer.

In certain embodiments, sludge may be treated with bacteria to remove at least a portion of pathogens in the sludge (e.g., a digestion process). The sludge may be digested and then thickened to form biosolids. In some embodiments, treatment of the sludge with bacteria may occur after the sludge has been thickened. In some embodiments, digestion may be performed under anaerobic conditions. Under anaerobic conditions, methane may be produced and recovered as a source of energy. At least a portion of the digested or thickened sludge may be recycled from solids treatment system 408 to secondary treatment system 404 via conduit 442. Digested sludge may include nutrients (e.g., cytoplasm) that may be used to aid microbial growth in secondary treatment system 404. In some embodiments, at least a portion of the digested sludge stream may be mixed with other sludge in conduit 414 prior to entering secondary treatment system 404.

Sludge may include at least 99% by weight water, at least 95% by weight water, at least 90% by weight water, at least 80% by weight water, at least 70% by weight water. Sludge may be thickened using gravity and/or mechanical techniques known in the art to remove at least a portion of the water in the biosolids. Techniques for thickening sludge include, but are not limited to, gravity belt thickening, filtration (e.g., belt-filter press, filter press), drying beds, centrifugation, or combinations thereof. The sludge may be subject to multiple thickening steps to decrease the amount of water in the sludge to produce biosolids. After thickening using conventional techniques, total solids in the biosolids may be at most 15% by weight, at most 10% by weight, at most 5% by weight, or at most 1% by weight. The thickened biosolids may be transported to disposal facilities or other processing facilities. The thickened solids may be dried, composted, or treated with additives such as lime or other alkaline materials, and/or polymers. In some embodiments, treatment of the biosolids with lime, ferric chloride, and/or polymers may change a size of the biosolids. A change in size may facilitate production and/or handling of the biosolids.

Treatment of sludge in the fluid treatment system may thicken the sludge, destroy and/or kill at least a portion of the pathogens in the sludge to produce biosolids. Biosolids produced from the fluid treatment system may have a total solids content of at least 5%, at least 10%, at least 15%, at least 20%, at least 30%, or at least 50%. Processing of sludge through a fluid treatment system to form biosolids may increase the percent of solids in the biosolids to about 80%, to about 70%, to about 60%, to about 50%. Treatment of sludge stream in the fluid treatment system may reduce odors emanating from the sludge. Odor reduction may be caused by reduction of sulfur containing compounds. Sulfur containing compounds include, but are not limited to, hydrogen sulfide, thiols, or mixtures thereof. Treatment of the sludge stream in a fluid treatment system may convert the sulfur compounds to bisulfite compounds. Bisulfite compounds may not be as odiferous as other sulfur containing compounds. Use of the fluid treatment system to convert sludge to biosolids may allow for the removal of one or more units used to thicken and/or digest the sludge. The fluid treatment system may be a more efficient process than currently used techniques because the sludge can be recycled to the fluid treatment system until the desired concentration of solids is obtained.

Figure 15:
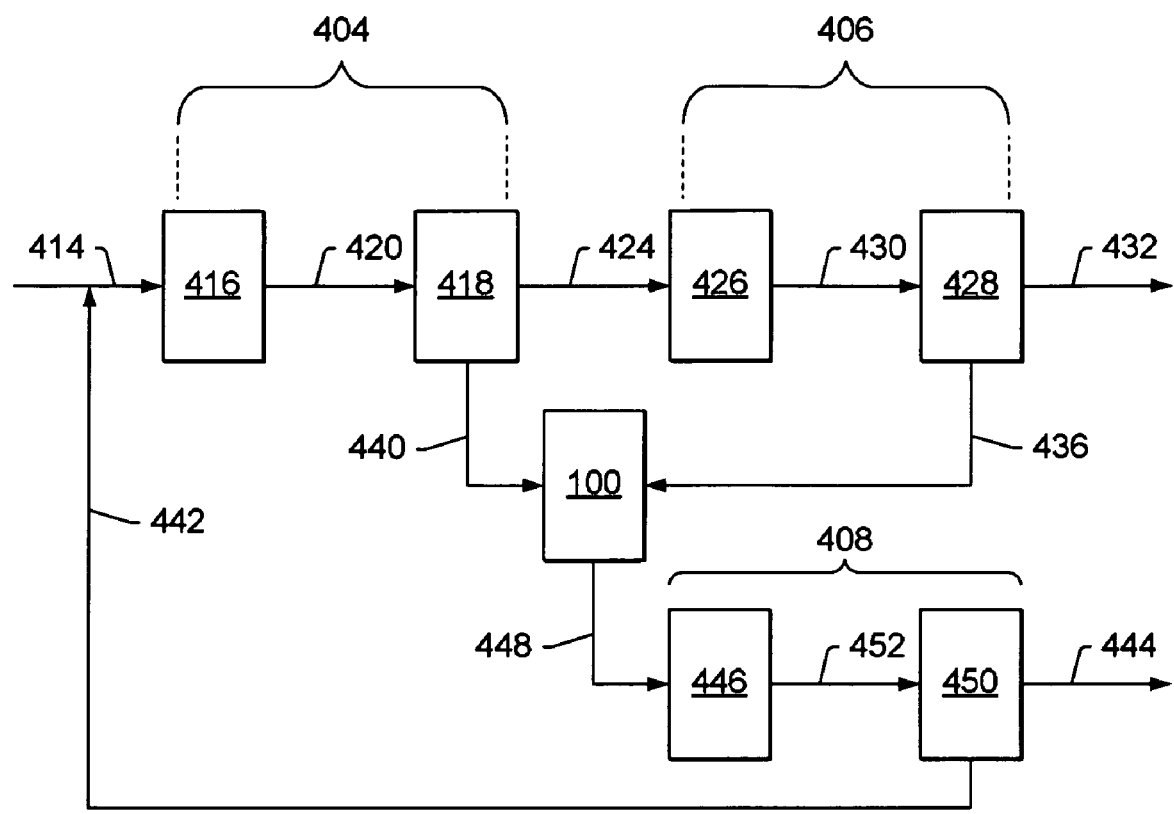
FIG. 15 depicts a schematic of an embodiment of a wastewater treatment facility that includes a fluid treatment system coupled to secondary treatment system, a disinfection treatment system, and a solids treatment system.

FIG. 15 depicts solid treatment system 408 that includes fluid treatment system 100. Sludge from settling unit 418 of secondary treatment system 404 and/or sludge from clarifier 428 of disinfection treatment system 406 enters fluid treatment system 100 via conduits 440 and 436. In certain embodiments, a filtering device (e.g., ⅛ inch. screen and/or grid) is coupled to the inlet of fluid treatment system 100. The screen may remove large particles from the sludge.

Figure 16:
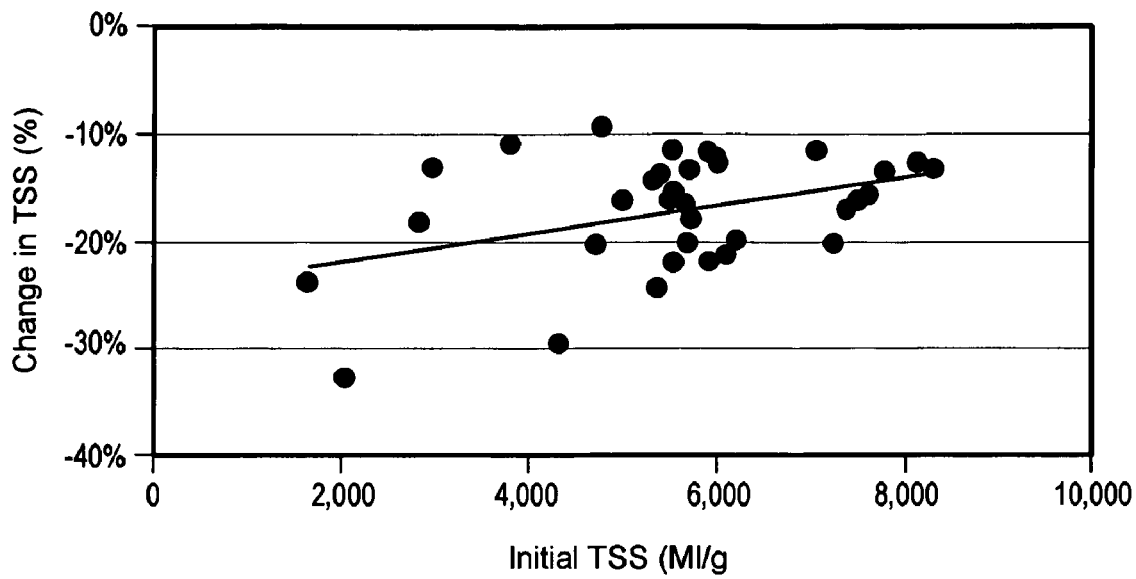
FIG. 16 depicts a graph denoting the change in solids in sludge during multiple passes through a fluid treatment system.
Figure 17:
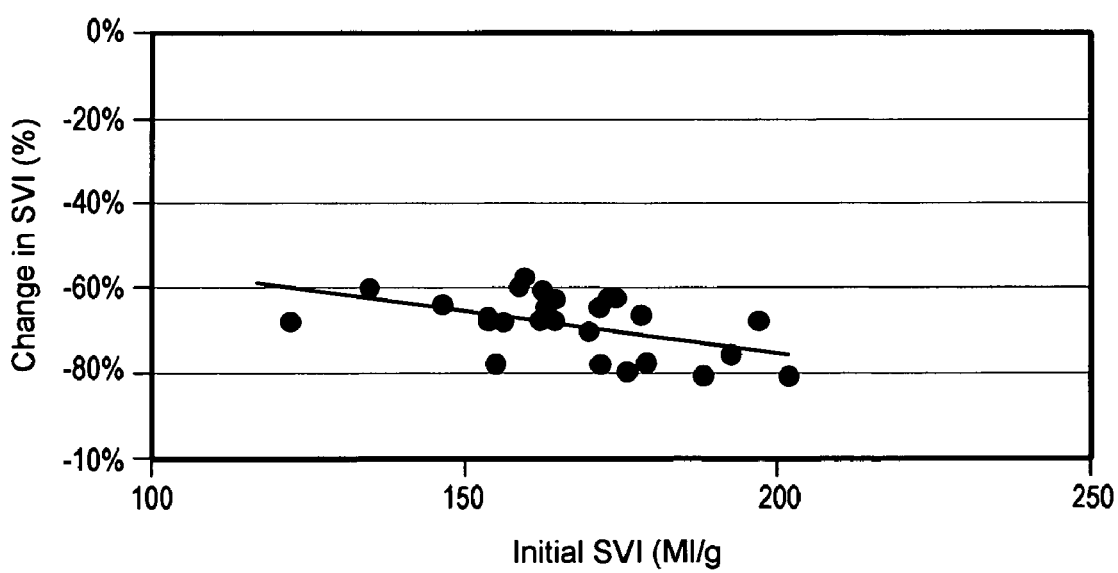
FIG. 17 depicts a graph denoting the change in sludge volume during multiple passes through a fluid treatment system.

In fluid treatment system 100, biological contaminants are killed and/or partially destroyed. Sludge received from disinfection treatment system 406 may be deflocculated as the sludge pass through fluid treatment system 100. As the sludge passes through fluid treatment system 100 at least a portion of the water is removed from the stream to produce a stream having a total sludge solids content of at least 5%, at least 10%, at least 30% or at least 50%. A total amount of water removed from the sludge stream processed in fluid treatment system 100 may range from about 1% to about 60% by weight, from about 5% to about 50% by weight, from about 10% to about 40% by weight and from about 20% to about 30% by weight. For example, waste activated sludge from a secondary treatment system was treated in fluid treatment system 100. The percent change in total solids in the sludge (change in TSS (%)) and the percent increase in the volume of sludge (change in SVI %) are shown in FIGS. 16 and 17.

As shown in FIG. 15, treated sludge exits fluid treatment system 100 and enters digestion unit 446 of solids treatment system 408 via conduit 448. In digestion unit 446, the sludge may be additionally treated to remove contaminants to meet government standards. In some embodiments, enough biological contaminants are removed by the fluid treatment system so that digestion unit 446 is not necessary. If digestion unit 446 is used, treated sludge exits the digestion unit and enters dewatering unit 450 via conduit 452. In dewatering unit 450, additional water is removed from the sludge stream to produce biosolids. Dewatering unit 450 may include gravity and/or mechanical dewatering equipment.

Figure 18:
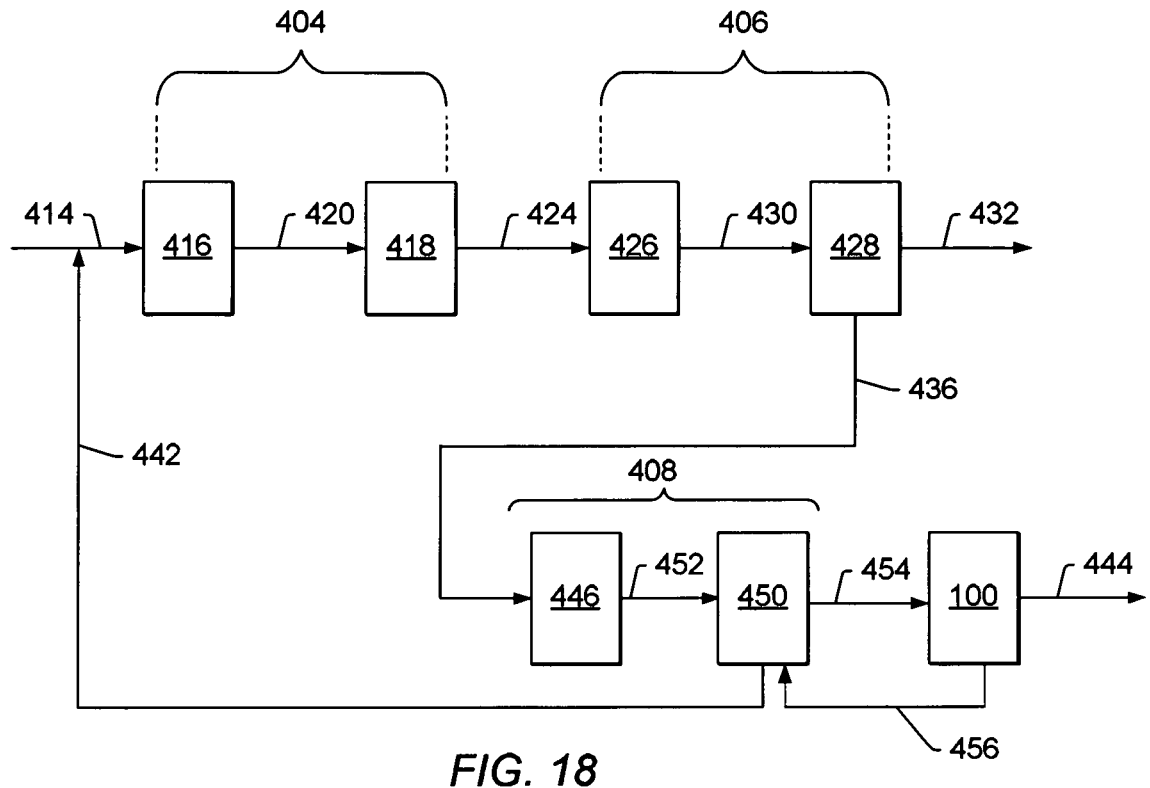
FIG. 18 depicts a schematic of an embodiment of a wastewater treatment facility that includes a fluid treatment system coupled to dewatering system.

As shown in FIG. 18, fluid treatment system 100 may be positioned after dewatering unit 450. A dewatered sludge stream may exit dewatering unit 450 and enter fluid treatment system 100 through conduit 454. After and/or during processing of the dewatered sludge stream at least a portion of the stream treated in fluid treatment system 100 may be recycled to dewatering unit 450 through conduit 456 until the desired water content of the biosolids is achieved. The biosolids may exit fluid treatment system through conduit 444 to be transported and/or disposed of using techniques known in the art. In some embodiments, the water content of the biosolids is of a sufficient level that recycling of the sludge stream from fluid treatment system 100 to dewatering system 450 is not necessary. For example, a sludge stream may be processed using a mechanical thickener and dried to produce biosolids that have a solids content of about 4% by weight. Flowing a sludge stream through a fluid treatment system, a mechanical thickener, and then drying the wet cake produced biosolids having a solids content of about 8.5% by weight. The biosolids may exit dewatering unit 450 via conduit 444 and be transported to one or more processing units. In some embodiments, the removal of water and pathogens in fluid treatment system 100 is such that digestion unit 446 and dewatering unit 450 are not necessary. In some embodiments, biosolids obtained from fluid treatment system 100 may be dried and then transported to other processing facilities.

Figure 19:
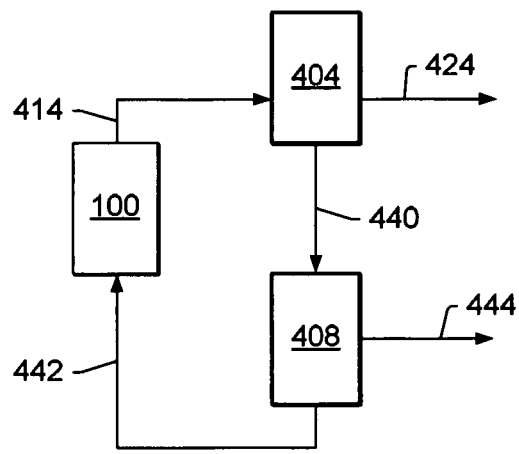
FIG. 19 depicts a schematic of an embodiment of a wastewater treatment facility that includes a fluid treatment system coupled to solids treatment system and a secondary treatment system.

In some embodiments, at least a portion of the digested sludge from solids treatment system 408 is recycled to secondary treatment system 404. As shown in FIG. 19, at least a portion of digested sludge exits solids treatment system 408 and enters fluid treatment system 100 via conduit 442. The digested sludge stream is processed by fluid treatment system 100 to lyse biological contaminants to produce nutrients for the microbial growth in secondary treatment system 404. The recycled sludge stream from fluid treatment system 100 is sent to secondary treatment system 404 via 414. In some embodiments, fluid treatment system 100 processes a combined stream from primary treatment system 402 and solids treatment system 408. In some embodiments, the recycled sludge stream is combined in conduit 414 and then transported to secondary treatment system 404.

In some embodiments, sludge may be recycled to a reservoir to assist in thickening the sludge. In some embodiments, the recycling of sludge may be performed under anaerobic conditions. As shown in FIG. 20A, sludge may exit settling unit 418 and enter reservoir 460 via conduit 424. Conduit 458 couples reservoir 460 to an inlet of fluid treatment system 100. Conduit 462 couples fluid treatment system 100 back to reservoir 460. In some embodiments, reservoir 460 is digestion unit 446. During use, at least a portion of the sludge exiting fluid treatment system 100 is recycled back into the fluid treatment system, rather than being sent to the reservoir. Recycle conduit 464 may be coupled to exit conduit 462 to allow the sludge to be recycled. A three-way valve may be positioned at the intersection of conduits 462 and 464 to control the flow of the sludge. As shown, sludge is treated in fluid treatment system 100 under anaerobic conditions. Hydrocarbon gas (e.g., methane) generated during the processing exits reservoir 460 via conduit 466. The generated hydrocarbon gas may be used by the wastewater treatment facility as a source of energy and/or transported to other facilities. It should be understood that the reservoir and fluid treatment system recycle configuration may be used with any fluid treatment system for treatment of wastewater.

As shown in FIG. 20B, sludge may exit secondary treatment system 404 and enter reservoir 460 via conduit 424. Conduit 458 couples reservoir 460 to an inlet of fluid treatment system 100. Conduit 462 couples fluid treatment system 100 back to reservoir digestion unit 446.

As shown in FIG. 20C, the sludge may enter dewatering unit 450 via conduit 424 prior to entering reservoir 460. Partially dewatered sludge may exit dewatering unit 450 (e.g., a gravity thickener) and enter reservoir via conduit 466. Conduits 468 and 462 may couple reservoir 460 and fluid treatment system 100 together. During use, at least a portion of the sludge exiting fluid treatment system 100 is recycled back into the fluid treatment system. The sludge may exit reservoir and enter an additional dewatering unit 450' (e.g., belt-filter press, filter press, drying beds, centrifugation, or combinations thereof) via conduit 452. Processing of the sludge through dewatering unit 450, fluid treatment system 100 and then through additional dewatering unit 450' produces a thicker sludge than sludge produced using conventional sludge thickening techniques. The thicker sludge when further dewatered may produce biosolids having an increased solids content (e.g., solids content of at least 5%, at least 10%, at least 20%, at least 30%, at least 40%, at least 50%). For example, sludge may be passed through a gravity thickener to at least partially dewater the sludge. The partially dewatered sludge may enter a sludge tank coupled to a fluid treatment system. Processing the sludge through the fluid treatment system increased the total amount of solids in the sludge by at least 15%. Further dewatering of the sludge using mechanical dewatering equipment produced dry biosolids having a total solids content of about 36%. In comparison, dewatering sludge using gravity thickening and mechanical dewatering equipment produces dry biosolids having a total solids content of less than 20%.

In some embodiments, an inlet of fluid treatment system 100 is connected to a screen. The screen may receive a continuous stream from reservoir 460. In some embodiments, screens are coupled to inlets of the fluid treatment system, the secondary treatment system, the disinfection treatment system and/or the solids treatment system. A screen may allow a portion of the sludge to be screened and processed through fluid treatment system 100. In some embodiments, the screen receives a continuous stream from reservoir 460 thus allowing nearby continuous processing of the reservoir volume through the screening mechanism and into the fluid treatment system.

In some embodiments, the screen may partition thickened sludge and discharge the thickened sludge into a small holding tank. The fluid treatment system is connected to the holding tank and continuously processes the thickened sludge for a specific number of passes.

Processing of the sludge in fluid treatment system 100 under recycled conditions may produce biosolids that have a total solids content of at least 5% by weight, at least 10% by weight, at least 15% by weight, at least 20% by weight, or at least 50% by weight. Processing of the sludge may substantially remove pathogens from the sludge and substantially remove odors from the sludge to produce biosolids suitable for use in commercial, industrial, and/or residential applications. For example, fluid treatment system 100 was coupled to sludge reservoir 460 having a capacity of 40,000 gallons so that the waste activated sludge may be processed in the fluid treatment system and returned to the reservoir 460. Recycling sludge from reservoir 460 through fluid treatment system 100 at a rate of about 8,241 gallons per day reduced the total sludge solids by about 15% on average and the reduction in total SVI was about 45% on average.

In some embodiments, additives may be added to treatment system 100 to assist in the killing of pathogens, assist in the removal of odors and/or be used as swelling agents. In some embodiments, water and/or volatile organic compounds are substantially removed from the sludge during processing in fluid treatment system 100. The biosolids exit fluid treatment system 100 and enter dewatering unit 450 via conduit 452 for additional water removal (see FIG. 15). The fully dewatered biosolids exit dewatering unit 450 via conduit 444 for transportation to other processing facilities and/or disposal facilities. In some embodiments, water removal from the sludge using fluid treatment system 100 is sufficient such that dewatering unit 450 is not needed.

In some embodiments, the amount of biological contaminants in wastewater and/or sludge streams may be assessed prior to introducing the streams into the fluid treatment system. For example, a sample from reservoir 460 may be removed and tested for biological contaminants. Alternatively, in-line monitoring equipment may be coupled to conduits 458 and 462 to allow continuous monitoring of the biological contaminants in the reservoir.

Figure 21:
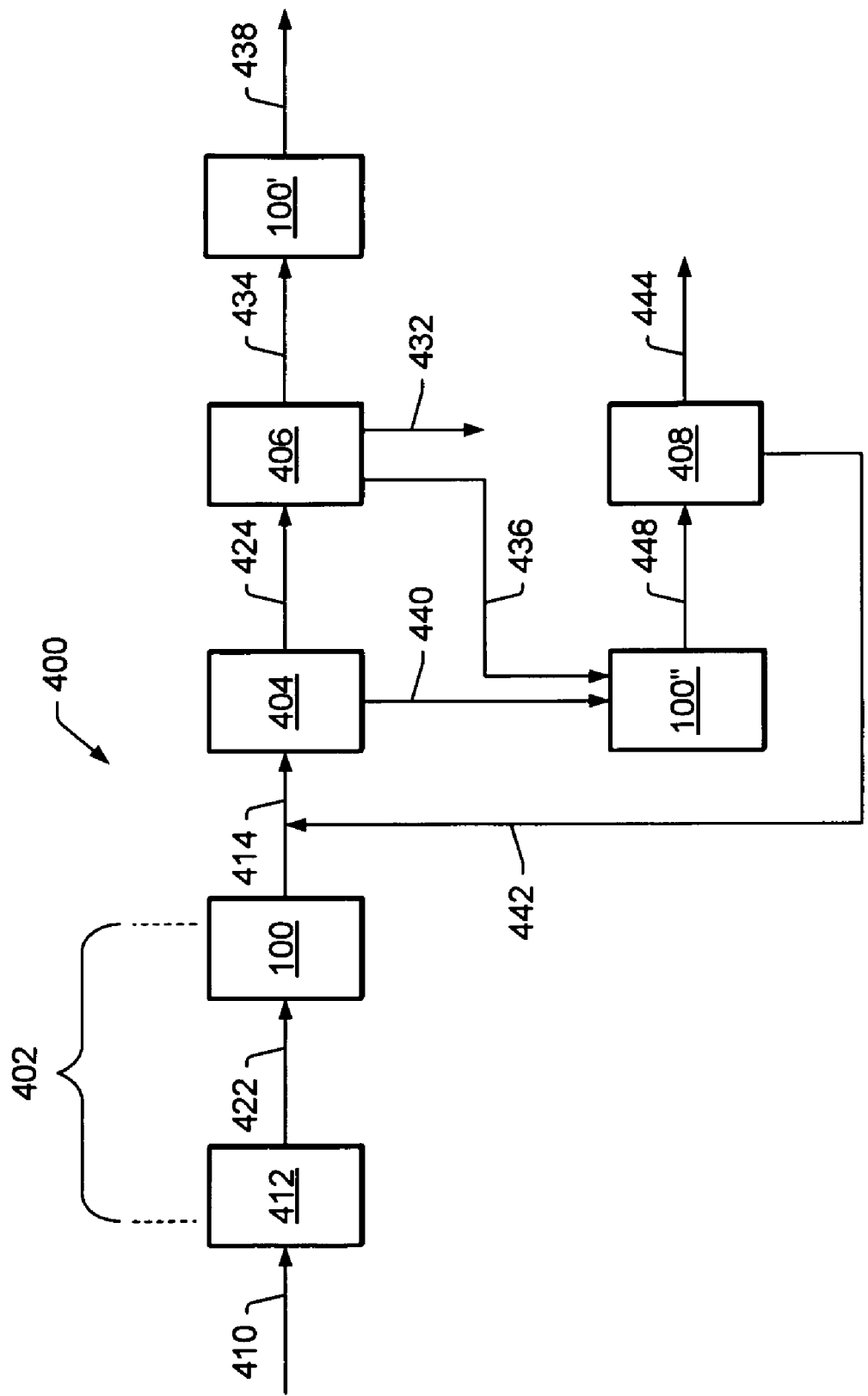
FIG. 21 depicts a schematic of an embodiment of a wastewater treatment facility that includes at least three fluid treatment systems.
Figure 22:
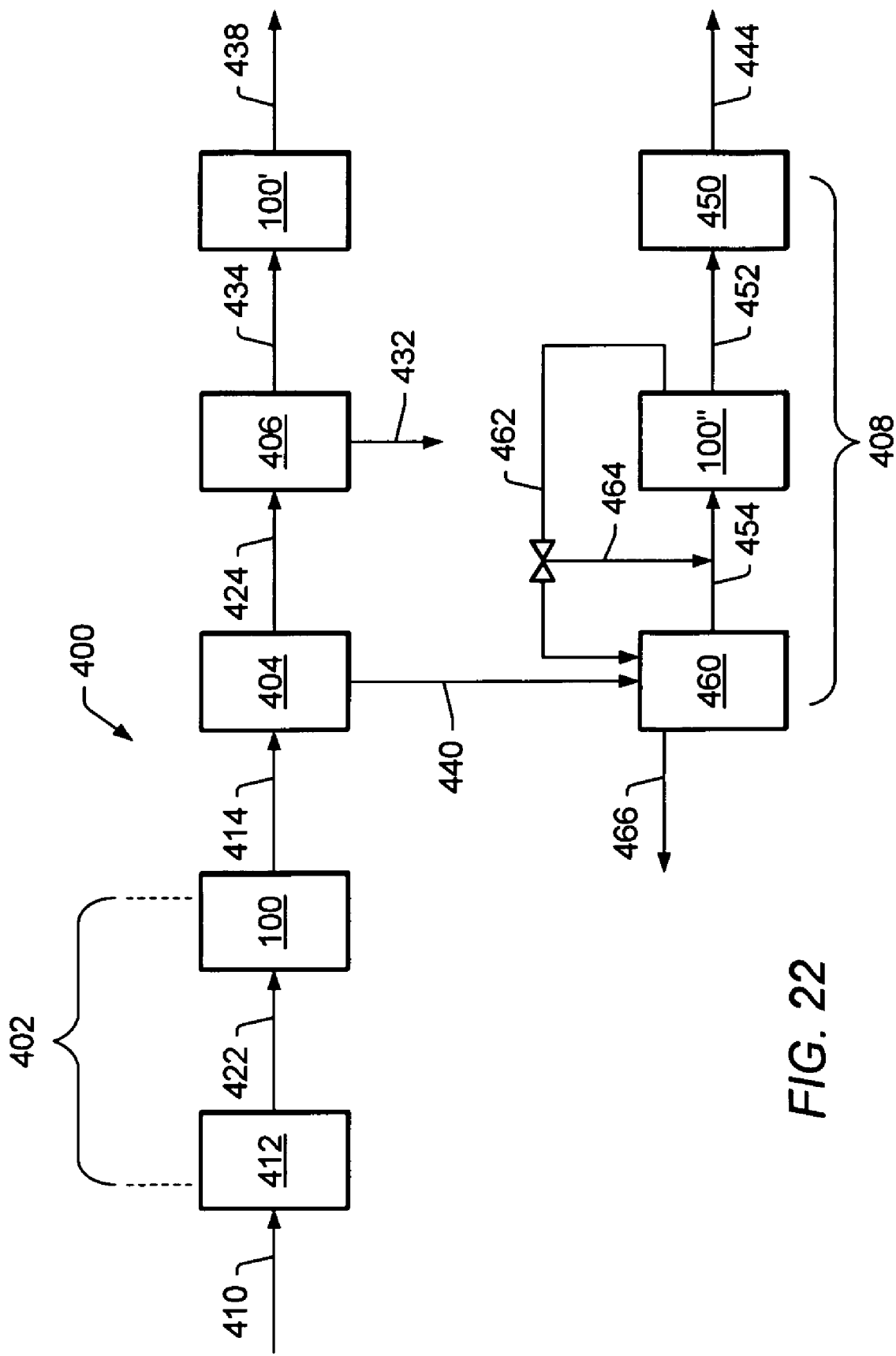
FIG. 22 depicts a schematic of an embodiment of a wastewater treatment facility that includes at least three fluid treatment systems.

FIG. 21 and FIG. 22 depict embodiments of a wastewater treatment system that includes at least three fluid treatment systems. Raw wastewater stream enters settling unit 412 of primary treatment system 402 via conduit 410. At least a portion of the debris present in the raw wastewater stream is removed in settling unit 412. The resulting wastewater stream is processed in fluid treatment system 100 as previously described herein to produce a waste stream. The waste stream enters secondary treatment system 404 via conduit 414. The waste stream is processed in secondary treatment system 404 to produce a water stream as previously described herein. The water stream enters disinfection treatment system 406 via conduit 424. The water stream is treated in disinfection treatment system 406 as previously described herein to produce potable water and a chlorinated water stream. The potable water exits disinfection treatment system 406 via conduit 432 to be distributed to local municipalities and/or other facilities that require potable water. The chlorinated water stream exits disinfection treatment system 406 via conduit 434 and enters fluid treatment system 100". In fluid treatment system 100' the chlorinated water stream is processed as described herein to produce an effluent suitable for discharge into one or more receiving water bodies via conduit 438.

As shown in FIG. 21, sludge and solids from secondary treatment system 404 and disinfection treatment system 406 enter fluid treatment system 100" via conduits 440 and 436. In some embodiments, solids from disinfection treatment system 406 are not sent to treatment system 100". In fluid treatment system 100", the sludge and solids are treated as described herein to kill and/or destroy biological contaminants and/or to deflocculate solids. Treated sludge from fluid treatment system 100" enters solids treatment system 408 via conduit 448. In solids treatment system 408, water is removed and any other treatments necessary to produce biosolids are performed. In some embodiments, a fluid treatment system is positioned after the solids treatment system. Biosolids exit solids treatment system 408 via conduit 444 to be transported to other facilities.

As shown in FIG. 22, sludge from secondary treatment system 404 enters solids treatment system 408 via conduit 440. Solids treatment system 408 includes reservoir 460, fluid treatment system 100" and dewatering unit 450. As previously described sludge is converted to biosolids in solids treatment system 404. Biosolids exit solids treatment system 408 via conduit 444 to be transported to other facilities.

In this patent, certain U.S. patents and other materials (e.g., articles) have been incorporated by reference. The text of such U.S. patents and other materials is, however, only incorporated by reference to the extent that no conflict exists between such text and the other statements and drawings set forth herein. In the event of such conflict, then any such conflicting text in such incorporated by reference U.S. patents and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for treating wastewater including biological contaminants comprising:
    separating solid particles from raw wastewater to produce a wastewater stream;
    introducing the wastewater stream to a fluid treatment system, the fluid treatment system comprising a first vortex nozzle unit, a second vortex nozzle unit positioned in substantially opposed relation to the first vortex nozzle unit, and a manifold configured to divide the wastewater stream into a first wastewater fluid flow and a second wastewater fluid flow;
    flowing the first wastewater fluid flow through the first vortex nozzle unit and flowing the second wastewater fluid flow through the second vortex nozzle unit so that a first rotating wastewater fluid flow exiting the first vortex nozzle unit impinges on a second rotating wastewater fluid flow exiting the second vortex nozzle unit to produce a contacted wastewater stream, wherein the opposing first and second vortex nozzles are arranged such that collision of the first rotating wastewater fluid flow exiting first vortex nozzle unit with the second rotating wastewater fluid flow exiting the second vortex nozzle unit destroys at least a portion of the biological contaminants in the rotating wastewater fluid flows;
    flowing the contacted wastewater stream produced by the impingement of the first rotating wastewater fluid flow with the second rotating wastewater fluid flow to an outlet of the fluid treatment system; and
    flowing the contacted wastewater stream produced by the impingement of the first rotating wastewater fluid flow with the second rotating wastewater fluid flow from the outlet of the fluid treatment system through a secondary treatment system comprising at least one aeration unit and at least one settling unit, wherein the at least one aeration unit and the at least one settling unit of the secondary treatment system are configured to remove at least a portion of the organic material from the contacted wastewater stream produced by the impingement of the first rotating wastewater fluid flow with the second rotating wastewater fluid flow from the outlet of the fluid treatment system.

2. The method of claim 1, wherein the wastewater stream comprises particulates and wherein the collision of the first rotating wastewater fluid flow exiting first vortex nozzle unit with the second rotating wastewater fluid flow exiting the second vortex nozzle unit reduces a particle size of at least a portion of the particulates in the wastewater stream.

3. The method of claim 1, wherein the collision of the first rotating wastewater fluid flow exiting first vortex nozzle unit with the second rotating wastewater fluid flow exiting the second vortex nozzle unit reduces an amount of oxygen consumed in the break down of organic matter through biological processes.

4. The method of claim 1, wherein the solid particles are separated from raw wastewater in a primary treatment system, wherein the primary treatment system comprises a settling tank and wherein the fluid treatment systems is coupled to an outlet of the settling tank.

5. The method of claim 1, further comprising adding an additive to a wastewater stream as the wastewater stream passes through the first and/or second vortex nozzle unit.

6. The method of claim 1, further comprising flowing an effluent stream from the secondary treatment system to a disinfection system, wherein the disinfection system is configured to eradicate at least a portion of the biological contaminants in the effluent stream.

7. The method of claim 6, further comprising flowing an effluent stream from the disinfection system to a solids treatment system, wherein the solids treatment system is configured to produce a bio solid from the effluent stream.

8. The method of claim 1, further comprising flowing an effluent stream from the secondary treatment system to a solids treatment system, wherein the solids treatment system is configured to produce a biosolid from the effluent stream.

9. The method of claim 1, further comprising adding a non-biocide additive to a wastewater stream as the wastewater stream passes through the first and/or second vortex nozzle unit, the non-biocide additive configured to increase the speed and/or quantity of bacteria killed in the fluid treatment system.

10. A method for treating wastewater including biological contaminants comprising:
    separating solid particles from raw wastewater to produce a wastewater stream;
    introducing the wastewater stream into a reservoir,
    introducing a wastewater stream drawn from the reservoir into a fluid treatment system, the fluid treatment system comprising a first vortex nozzle unit, a second vortex nozzle unit positioned in substantially opposed relation to the first vortex nozzle unit, and a manifold configured to divide the wastewater stream into a first wastewater fluid flow and a second wastewater fluid flow;
    flowing the first wastewater fluid flow through the first vortex nozzle unit and flowing the second wastewater fluid flow through the second vortex nozzle unit so that a first rotating wastewater fluid flow exiting the first vortex nozzle unit impinges on a second rotating wastewater fluid flow exiting the second vortex nozzle unit to produce a contacted wastewater stream, wherein the opposing first and second vortex nozzles are arranged such that collision of the first rotating wastewater fluid flow exiting first vortex nozzle unit with the second rotating wastewater fluid flow exiting the second vortex nozzle unit destroys at least a portion of the biological contaminants in the rotating wastewater fluid flows; and
    flowing the contacted wastewater stream produced by the impingement of the first rotating wastewater fluid flow with the second rotating wastewater fluid flow to an outlet of the fluid treatment system.

11. The method of claim 10, wherein the wastewater stream introduced into the reservoir and the wastewater stream drawn from the reservoir comprise sludge.

12. The method of claim 11, wherein the reservoir is an anaerobic digestion unit configured to remove at least a portion of pathogens from sludge in the reservoir, wherein wastewater drawn from the reservoir into the fluid treatment system comprises digested sludge produced by the anaerobic digestion unit.

13. The method of claim 10, further comprising, before introducing the wastewater stream into the reservoir, flowing the wastewater stream through a secondary treatment system comprising at least one aeration unit and at least one settling unit, wherein the at least one aeration unit and the at least one settling unit of the secondary treatment system are configured to remove at least a portion of the organic material from the wastewater stream.

14. The method of claim 10, further comprising flowing at least a portion of the contacted wastewater stream produced by the impingement of the first rotating wastewater fluid flow with the second rotating wastewater fluid flow back to the reservoir.

15. The method of claim 10, further comprising:
recycling at least a portion of the contacted wastewater stream produced by the impingement of the first rotating wastewater fluid flow with the second rotating wastewater fluid flow back through the fluid treatment system; and flowing at least a portion of the recycled contacted wastewater stream back to the reservoir.

16. The method of claim 10, further comprising, before introducing the wastewater stream into the reservoir, flowing the wastewater stream through a disinfection system.

* * * * *

UNITED STATES PATENT AND TRADEMARK OFFICE
CERTIFICATE OF CORRECTION

PATENT NO. : 7,651,614 B2  Page 1 of 1
APPLICATION NO. : 12/030643
DATED : January 26, 2010
INVENTOR(S) : Kelsey et al.

It is certified that error appears in the above-identified patent and that said Letters Patent is hereby corrected as shown below:

Claim 4, col. 28, line 10, please delete "systems" and substitute therefor -- system --.

Claim 7, col. 28, line 23, please delete "bio solid" and substitute therefor -- biosolid --.

Signed and Sealed this

Sixteenth Day of March, 2010

David J. Kappos
*Director of the United States Patent and Trademark Office*